United States Patent
Park

(10) Patent No.: US 10,474,147 B2
(45) Date of Patent: Nov. 12, 2019

(54) AUTONOMOUS VEHICLE

(71) Applicant: LG ELECTRONICS INC., Seoul (KR)

(72) Inventor: Sangha Park, Seoul (KR)

(73) Assignee: LG Electronics Inc., Seoul (KR)

(*) Notice: Subject to any disclaimer, the term of this patent is extended or adjusted under 35 U.S.C. 154(b) by 255 days.

(21) Appl. No.: 15/206,674

(22) Filed: Jul. 11, 2016

(65) Prior Publication Data

US 2017/0038775 A1 Feb. 9, 2017

(30) Foreign Application Priority Data

Jul. 20, 2015 (KR) .................. 10-2015-0102546

(51) Int. Cl.
*G05D 1/00* (2006.01)
*B60W 50/00* (2006.01)
(Continued)

(52) U.S. Cl.
CPC ............ *G05D 1/0088* (2013.01); *B60W 10/06* (2013.01); *B60W 10/22* (2013.01); *B60W 30/182* (2013.01); *B60W 50/00* (2013.01); *B60W 50/082* (2013.01); *F02D 41/0007* (2013.01); *F02D 41/021* (2013.01);
(Continued)

(58) Field of Classification Search
CPC .... G05D 1/0088; B60W 10/06; B60W 10/22; B60W 30/182; B60W 50/00; B60W 50/082; B60W 2550/142; B60W 2550/147; B60W 2550/402; B60W 2710/18; B60W 2710/20; B60W 2710/22; B60W 2720/24; F02C 41/0007; F02D 41/021; F02D 2200/604; F02D 41/0007; G01C 21/3492; Y02T 10/144
See application file for complete search history.

(56) References Cited

U.S. PATENT DOCUMENTS 5,913,917 A * 6/1999 Murphy ............ B60R 16/0232
701/123
8,260,482 B1 9/2012 Szybalski et al.
(Continued)

FOREIGN PATENT DOCUMENTS

CN 102207038 10/2011
CN 103661364 3/2014
(Continued)

OTHER PUBLICATIONS

Freiburger, David, "The Mad Max Switchable Blower Becomes Reality at Procharger: SEMA 2012," Oct. 2012, 8 pages, URL<http://www.hotrod.com/articles/the-mad-max-switchable-blower-becomes-reality-at-procharger-sema-2012/>.
(Continued)

*Primary Examiner* — Sze-Hon Kong
(74) *Attorney, Agent, or Firm* — Fish & Richardson P.C.

(57) ABSTRACT

An autonomous vehicle includes an input unit configured to receive selection input of at least one of a time mode for driving to a set destination, a fuel efficiency mode, a safety mode, or a comfort mode. The autonomous vehicle further includes a power source driver configured to control an engine comprising a supercharger or a turbocharger or both and a controller configured to control the power source driver to turn the supercharger or the turbocharger on or off according to the selected mode.

21 Claims, 23 Drawing Sheets

(51) Int. Cl.
  *B60W 50/08* (2012.01)
  *B60W 10/06* (2006.01)
  *B60W 10/22* (2006.01)
  *F02D 41/02* (2006.01)
  *F02D 41/00* (2006.01)
  *B60W 30/182* (2012.01)
  *G01C 21/34* (2006.01)

(52) U.S. Cl.
  CPC ... *G01C 21/3492* (2013.01); *B60W 2550/142* (2013.01); *B60W 2550/147* (2013.01); *B60W 2550/402* (2013.01); *B60W 2710/18* (2013.01); *B60W 2710/20* (2013.01); *B60W 2710/22* (2013.01); *B60W 2720/24* (2013.01); *F02D 2200/604* (2013.01); *Y02T 10/144* (2013.01)

(56) References Cited

U.S. PATENT DOCUMENTS

| | | | | |
|---|---|---|---|---|
| 9,361,797 | B1* | 6/2016 | Chen | G08G 1/0112 |
| 9,371,072 | B1* | 6/2016 | Sisbot | G01C 21/3658 |
| 2006/0076741 | A1* | 4/2006 | Lim | B60G 15/067 |
| | | | | 280/5.508 |
| 2009/0222188 | A1* | 9/2009 | Igarashi | F02B 37/16 |
| | | | | 701/102 |
| 2010/0073158 | A1* | 3/2010 | Uesaka | B60Q 9/00 |
| | | | | 340/450.2 |
| 2010/0331143 | A1* | 12/2010 | Jager | B60W 10/02 |
| | | | | 477/167 |
| 2011/0187518 | A1 | 8/2011 | Strumolo et al. | |
| 2011/0289915 | A1* | 12/2011 | Gentile | F02B 37/22 |
| | | | | 60/605.1 |
| 2015/0094948 | A1* | 4/2015 | Lu | G01C 21/3461 |
| | | | | 701/410 |
| 2015/0112526 | A1* | 4/2015 | Martin | G01C 21/3697 |
| | | | | 701/22 |
| 2015/0179062 | A1* | 6/2015 | Ralston | G01C 21/26 |
| | | | | 701/117 |
| 2015/0291027 | A1* | 10/2015 | Strasser | B60K 23/08 |
| | | | | 701/69 |
| 2015/0308837 | A1* | 10/2015 | Cudak | G05D 1/0278 |
| | | | | 701/23 |
| 2016/0069699 | A1* | 3/2016 | Chen | G01C 21/3605 |
| | | | | 701/426 |
| 2016/0084149 | A1* | 3/2016 | Dale-Jones | F02B 33/40 |
| | | | | 60/624 |
| 2016/0200317 | A1* | 7/2016 | Danzl | B60K 28/06 |
| | | | | 701/25 |
| 2016/0214617 | A1* | 7/2016 | Arndt | B60W 40/076 |
| 2016/0288788 | A1* | 10/2016 | Nagasaka | B62D 15/025 |
| 2016/0303979 | A1* | 10/2016 | Heyse | B60L 1/02 |
| 2017/0010613 | A1* | 1/2017 | Fukumoto | G08G 1/096827 |
| 2017/0076598 | A1* | 3/2017 | Scofield | G08G 1/0112 |
| 2017/0219364 | A1* | 8/2017 | Lathrop | G01C 21/3453 |
| 2017/0225677 | A1* | 8/2017 | Yoshida | A61B 5/0476 |
| 2017/0254277 | A1* | 9/2017 | Yoshizawa | F02B 37/04 |
| 2018/0128630 | A1* | 5/2018 | Golding | G01C 21/3492 |

FOREIGN PATENT DOCUMENTS

| | | |
|---|---|---|
| CN | 104773163 | 7/2015 |
| CN | 104781126 | 7/2015 |
| DE | 10327255 | 2/2004 |
| DE | 2004020110 | 11/2005 |
| EP | 2112407 | 10/2009 |
| JP | 200417867 | 1/2004 |
| JP | 2005238992 | 9/2005 |
| JP | 2013181393 | 9/2019 |
| KR | 101251502 | 4/2013 |
| KR | 1020150074750 | 7/2015 |

OTHER PUBLICATIONS

"Why do we not see switchable superchargers?," PistonHeads, Jun. 2011, 8 pages, URL<https://www.pistonheads.com/gassing/topic.asp?t=1012496>.

"Can a Turbo be made switchable?," Audi World Forums, Aug. 2007, 4 pages, URL<https://www.audiworld.com/forums/2-7t-v6-discussion-107/can-turbo-made-switchable-2686224/>.

Anonymous, "Self-study Programme 359 1.4I TSI Engine with Dual-charging: Design and Function," Volkswagen, Mar. 2006, 64 pages.

European Office Action in European Application No. 16180126, dated Feb. 12, 2016, 4 pages (with English translation).

Extended European Search Report in European Application No. 16202987.0, dated Apr. 25, 2017, 7 pages (with English translation).

* cited by examiner

AUTONOMOUS VEHICLE

CROSS-REFERENCE TO RELATED APPLICATION

This application claims the priority benefit of Korean Patent Application No. 10-2015-0102546, filed on Jul. 20, 2015 in the Korean Intellectual Property Office, the disclosure of which is incorporated herein by reference.

FIELD

The present disclosure relates to an autonomous vehicle.

BACKGROUND

A vehicle is an apparatus for moving a user who is riding in a desired direction. A representative example of the vehicle is an automobile.

Recently, electronic companies as well as conventional automobile companies have been involved in developing autonomous vehicles.

An autonomous vehicle can perform autonomous driving via communication with an external device or by recognizing and determining surrounding environments through various sensors attached to the autonomous vehicle.

An autonomous vehicle may provide a function of setting a destination and then moving to the set destination via autonomous driving.

SUMMARY

According to one aspect, an autonomous vehicle includes an input unit configured to receive selection input of at least one of a time mode for driving to a set destination, a fuel efficiency mode, a safety mode, or a comfort mode. The autonomous vehicle further includes a power source driver configured to control an engine comprising a supercharger or a turbocharger or both, and a controller configured to control the power source driver to turn the supercharger or the turbocharger on or off according to the selected mode.

Implementations of this aspect may include one or more of the following features. For example, the autonomous vehicle may further include a display device configured to display navigation information, where the controller is configured to control the power source driver based further on path information to the set destination, provided from the navigation information. In some cases, the autonomous vehicle may further include a camera module configured to acquire a vehicle front image, a vehicle rear image, or a vehicle surroundings image to thereby detect an object, where the controller is configured to control the power source driver based further on information of the detected object, provided from the camera module. The camera module may be configured to detect an uphill slope, a downhill slope, or a curve in the road, and the controller may be configured to control the power source driver based on whether the uphill slope, the downhill slope, or the curve is detected.

In some implementations, the autonomous vehicle may further include a chassis driver configured to control steering, suspension, or braking, where the controller is further configured to control the chassis driver according to the selected mode. In some cases, the autonomous vehicle may further include a pneumatic management unit configured to manage pneumatic condition of a tire, and a lift management unit configured to manage lift, where the controller is further configured to control the pneumatic management unit or the lift management unit according to the selected mode. The controller may be configured to control the pneumatic management unit to lower or raise a pneumatic pressure of the tire according to the selected mode, and wherein the controller is configured to control the lift management unit to adjust a spoiler according to the selected mode.

In some cases, the controller may be configured to, based on the time mode being selected, receive target arrival time or target driving time input up to the set destination and control the vehicle to be driven according to the target arrival time or the target driving time. Additionally, the autonomous vehicle may further include a display device configured to display an image for inputting the target arrival time or the target driving time, where the display device is configured to, based on the target arrival time or the target driving time being input, display whether the vehicle will arrive at the destination within the target arrival time or the target driving time. The controller may be configured to, based on the time mode being selected, control the vehicle to be driven along a path with a minimum of traffic signal lights or intersections among a plurality of paths to the destination.

In some implementations, the controller may be configured to, based on the fuel efficiency mode being selected, receive target fuel efficiency input for driving to the destination and control the vehicle according to the target fuel efficiency. Also, the autonomous vehicle may further include a display device configured to display an image comprising a scroll bar for inputting the target fuel efficiency, where the controller is configured to control the vehicle according to input through the scroll bar. The controller may be configured to, based on the fuel efficiency mode being selected, control the vehicle to be driven while maintaining preset speed.

Further, the controller may be configured to, based on the safety mode being selected, control the vehicle based on at least one of section information including traffic congestion, steering, acceleration or deceleration, a safe distance, or accident history. The controller may be configured to, based on the safety mode being selected, control the vehicle to be driven along a path with lowest traffic congestion among a plurality of paths to the destination. The controller may be configured to, based on the safety mode being selected, control the vehicle to be driven along a path with a minimum of steering, acceleration, or deceleration among a plurality of paths to the destination. The controller may be configured to control the vehicle to be driven while maintaining a preset distance or more from a leading vehicle. The controller may be configured to control the vehicle to be driven along a path with lowest accident history among a plurality of paths to the destination. The controller may be configured to receive setting input corresponding to section information including traffic congestion, steering, acceleration or deceleration, a distance, and accident history through the input unit and control the vehicle to be driven according to the setting input.

In some implementations, the controller may be configured to, based on the comfort mode being selected, control the vehicle to be driven along a path with a minimum of speed bumps, curves, uphill slopes, and downhill slopes among a plurality of paths to a destination. Additionally, the autonomous vehicle may further include a throttle valve configured to control an amount of fuel introduced into the engine, where the controller is configured to control the throttle valve according to the selected mode.

Detailed features of other implementations may be included in the detailed description and drawings.

DETAILED DESCRIPTION

Figure 1:
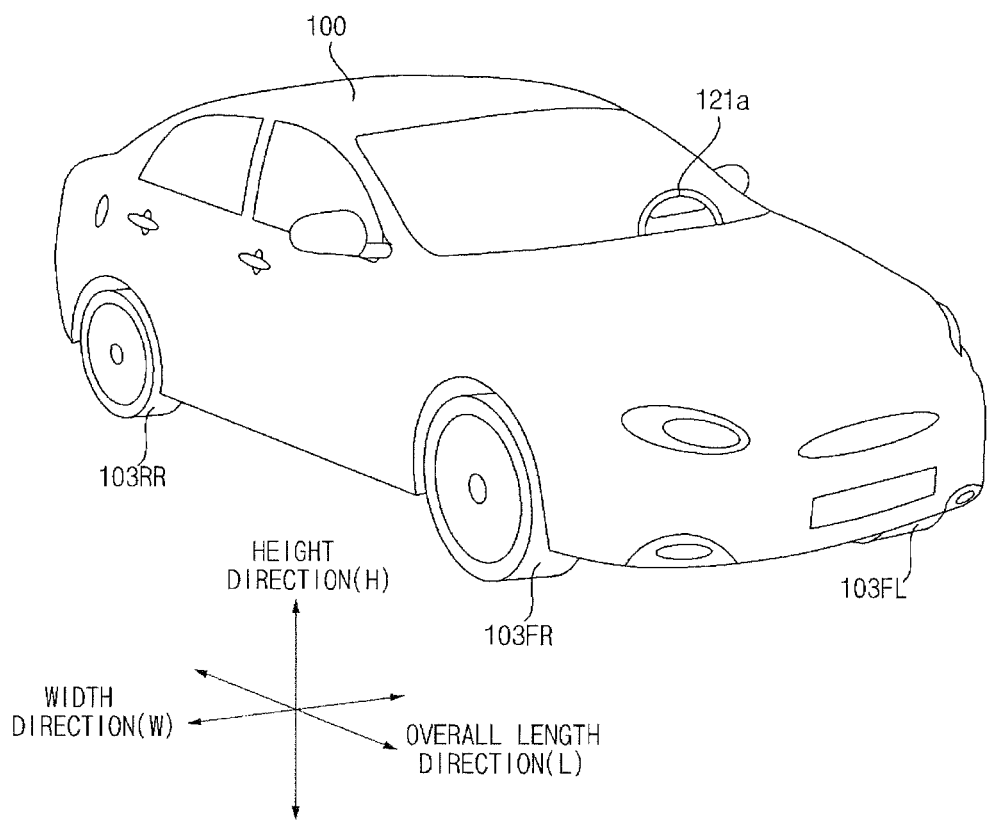
FIG. 1 is a diagram illustrating an outer appearance of an example autonomous vehicle.

References will now be made in detail to examples illustrated in the accompanying drawings. Use of the same reference numerals in the drawings denote like elements, and repeated explanations thereof may not be given.

In the specification, the term "autonomous vehicle" may include an automobile, a motorcycle, or the like. Hereinafter, the autonomous vehicle will be described in terms of an automobile. Additionally, the term "autonomous vehicle" may refer to an internal combustion engine autonomous vehicle including an engine as a power source, a hybrid autonomous vehicle including an engine or an electric motor as a power source, an electrical autonomous vehicle including an electrical motor as a power source, and so on.

While the examples below will be described in terms of a left hand drive (LHD) autonomous vehicle, a right hand drive (RHD) autonomous vehicle can also be used.

FIG. 1 is a diagram illustrating an outer appearance of an example autonomous vehicle 100 according to one implementation.

Referring to FIG. 1, the autonomous vehicle 100 may include wheels 103FR, 103FL, and 103RL that are rotated by a power source, and a steering input unit 121*a* for steering the autonomous vehicle 100. The wheel 103RR is hidden from view.

The autonomous vehicle 100 may be switched between an autonomous driving mode and a manual mode according to user input. In the manual mode, the autonomous vehicle 100 may receive steering input through the steering input unit 121*a*.

An overall length may refer to a distance from a rear portion to a front portion of the autonomous vehicle 100, a width may refer to the width of the autonomous vehicle 100, and a height may refer to a distance to a roof from a lower portion of the wheel. Hereinafter, a direction L of the overall length may refer to a reference direction for measurement of the overall length of the autonomous vehicle 100, a width direction W may refer to a reference direction for measurement of the width of the autonomous vehicle 100, and a height direction H may refer to a reference direction for measurement of the height of the autonomous vehicle 100.

Figure 2:
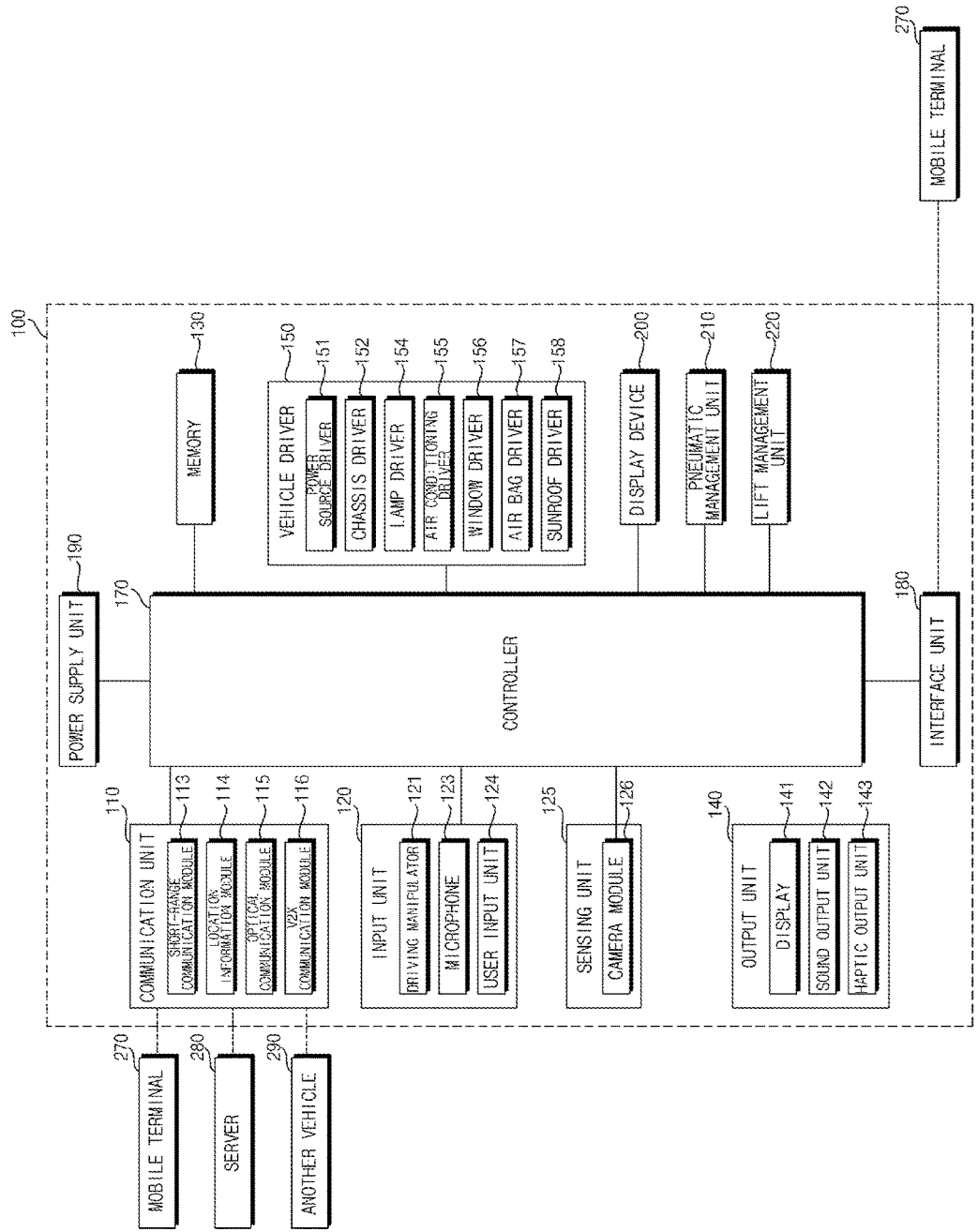
FIG. 2 is a diagram showing example internal components of the autonomous vehicle of FIG. 1.

FIG. 2 is a diagram showing example internal components of the autonomous vehicle 100 of FIG. 1.

Referring to FIG. 2, the autonomous vehicle 100 may include a communication unit 110, an input unit 120, a sensing unit 125, a memory 130, an output unit 140, a vehicle driver 150, a controller 170, an interface unit 180, a power supply unit 190, a display device 200, a pneumatic management unit 210, and a lift management unit 220.

The communication unit 110 may include a short-range communication module 113, a location information module 114, at optical communication module 115, and a V2X communication module 116.

The short-range communication module 113 may be used for short-range communication and may support short-range communication using at least one of Bluetooth™, radio frequency identification (RFID), infrared data association (IrDA), ultra wideband (UWB), ZigBee, near field communication (NFC), wireless-fidelity (Wi-Fi), Wi-Fi direct, and wireless universal serial bus (USB), among others.

The short-range communication module 113 may form a wireless area network and perform short-range communication between the autonomous vehicle 100 and at least one external device. For example, the short-range communication module 113 may wirelessly exchange data with a mobile terminal 270. The short-range communication module 113 may receive weather information and traffic situation information of a road (e.g., a transport protocol expert group (TPEG)) from the mobile terminal 270. For example, when a user rides in the autonomous vehicle 100, the mobile terminal 270 of the user and the autonomous vehicle 100 may be paired with each other automatically or by user application execution.

The location information module 114 may be a module for acquisition of a location of the autonomous vehicle 100, and a representative example of the location information module 114 may be a global positioning system (GPS) module. For example, when an autonomous vehicle uses a GPS module, a location of the autonomous vehicle may be acquired using a signal transmitted from a GPS satellite.

In some cases, the location information module 114 may be a component included in the sensing unit 125, but not a component included in the communication unit 110.

The optical communication module 115 may include a light emitter and a light receiver.

The light receiver may be configured to convert a light signal into an electrical signal and receive information. The light receiver may include a photodiode (PD) for receiving light. The PD may convert light into an electrical signal. For example, the light receiver may receive information about a leading autonomous vehicle through light emitted from a light source included in the leading autonomous vehicle.

The light emitter may include at least one light emitting device for converting an electrical signal into an optical signal. Here, the light emitter may be a light emitting diode (LED). The light emitter may convert an electrical signal into an optical signal and emits the optical signal externally. For example, the light emitter may convert an electrical signal into an optical signal and emit the optical signal externally. For example, the light emitter may emit an optical signal outward by blinking of a light emitting device at a predetermined frequency. In some implementations, the light emitter may include a plurality of light emitting device arrays. In some cases, the light emitter may be integrated with a lamp included in the autonomous vehicle 100. For example, the light emitter may be at least one of a headlight, a taillight, a brake light, a turn signal lamp, and a position lamp. For example, the optical communication module 115 may exchange data with another vehicle 290 via optical communication.

The V2X communication module 116 may be a module for enabling wireless communication with a server 280 or the other vehicle 290. The V2X communication module 116 may include a module implementing a protocol of communication V2V between autonomous vehicles or communication V2I between an autonomous vehicle and infrastructure. The autonomous vehicle 100 may perform wireless communication with the external server 280 and another vehicle 290 through the V2X communication module 116.

The input unit 120 may include a driving manipulator 121, a microphone 123, and a user input unit 124.

The driving manipulator 121 may receive user input for driving when the autonomous vehicle 100 is in a manual mode. The driving manipulator 121 may include the steering input unit 121a, a shift input unit 121b, an acceleration input unit 121c, and a brake input unit 121d.

The steering input unit 121a may receive steering input from a user in a manual mode. The steering input unit 121a may take the form of a wheel so as to input steering via rotation. In some implementations, the steering input unit 121a may take the form of a touchscreen, a touchpad, or a button.

The shift input unit 121b may receive input of parking P, driving D, neutral N, and reverse R in a manual mode. The shift input unit 121b may take the form of a lever. In some implementations, the shift input unit 121b may be formed as a touchscreen, a touchpad, or a button.

The acceleration input unit 121c may receive input for acceleration in a manual mode. The brake input unit 121d may receive input for deceleration in a manual mode. The acceleration input unit 121c and the brake input unit 121d may take the form of a pedal. In some implementations, the acceleration input unit 121c or the brake input unit 121d may be formed as a touchscreen, a touchpad, or a button.

The microphone 123 may process an external sound signal into electrical data. The processed data may be variously used according to a function performed by the autonomous vehicle 100. The microphone 123 may convert a user voice command into electrical data. The converted electrical data may be transmitted to the controller 170.

In some cases, the microphone 123 may be a component included in the sensing unit 125, but not a component included in the input unit 120.

The user input unit 124 is a component for receiving information from a user. In response to information input through the user input unit 124, the controller 170 may control an operation of the autonomous vehicle 100 so as to correspond to the input information. The user input unit 124 may include a touch type input unit or a mechanical input unit. In some cases, the user input unit 124 may be disposed in a region of a steering wheel. In such case, a driver may manipulate the user input unit 124 with his or her fingers while holding the steering wheel.

The user input unit 124 may include a touchscreen and may be integrated with a display 141 or the display device 200. The user input unit 124 may receive destination input.

The user input unit 124 may also receive driving mode selection input. In detail, the user input unit 124 may receive input of selection of any one of a time mode for driving to a set destination, a fuel efficiency mode, a safety mode, and a comfort mode.

In response to a driving mode being selected through the user input unit 124, the controller 170 may perform control according to the selected mode.

The sensing unit 125 may sense various situations of the autonomous vehicle 100. To this end, the sensing unit 125 may include a collision sensor, a wheel sensor, a speed sensor, a slope sensor, a weight detection sensor, a heading sensor, a yaw sensor, a gyro sensor, a position module, an autonomous vehicle driving/reverse sensor, a battery sensor, a fuel sensor, a tire sensor, a steering sensor via handle rotation, an autonomous vehicle interior temperature sensor, an interior humidity sensor, an illumination sensor, an ultrasonic sensor, a radar, a lidar, and so on.

The ultrasonic sensor, the radar, and/or the lidar may be used to detect information about an object. For example, the ultrasonic sensor, the radar, and/or the lidar may detect a distance from an object, relative speed, a size of an object, and so on through a time of flight (TOF) method.

Accordingly, the sensing unit 125 may acquire a sensing signal about autonomous vehicle collision information, autonomous vehicle direction information, autonomous vehicle position information (GPS information), autonomous vehicle angle information, autonomous vehicle speed information, autonomous vehicle acceleration information, autonomous vehicle inclination information, autonomous vehicle driving/reverse information, battery information, fuel information, tire information, autonomous vehicle lamp information, autonomous vehicle interior temperature information, autonomous vehicle interior humidity information, a steering wheel rotation angle, autonomous vehicle external illumination, and so on.

The sensing unit 125 may further include an acceleration pedal sensor, a pressure sensor, an engine rotation speed sensor, an air fluid sensor (AFS), an air temperature sensor (ATS), a water temperature sensor (WTS), a throttle position sensor (TPS), a TDC sensor, a crank angle sensor (CAS), and so on.

The sensing unit 125 may further include a camera module 126.

The camera module 126 may acquire a vehicle front image, a vehicle rear image, or a vehicle surroundings image, among others. The camera module 126 may detect an object from the acquired image.

The camera module 126 may include an image sensor and an image processing module. The camera module 126 may process a still image or video, acquired by an image sensor (e.g., CMOS or CCD). The image processing module may process the still image or video acquired through the image sensor, extract required information, and transmit the extracted information to the controller 170.

The autonomous vehicle 100 may include a front camera module 126a for capturing a front image of an autonomous vehicle, a surrounding view camera module 126b for capturing a surroundings image of the autonomous vehicle, an interior camera module 126c for capturing an internal image of the autonomous vehicle, and a rear camera module 126d for capturing a rear image of the autonomous vehicle. Each of the camera modules 126a, 126b, 126c, and 126d may include a lens, an image sensor, and a processor. The processor may computer-process a captured image to generate data or information and may transmit the generated data or information to the controller 170.

A processor included in the camera module 126 may be controlled by the controller 170.

The processor included in the camera module 126 may use at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions in terms of hardware.

The camera module may include the front camera module 126a, the surrounding view camera module 126b, the interior camera module 126c, and the rear camera module 126d.

The front camera module 126a may include a stereo camera module. In this case, a processor of the front camera module 126a may detect a distance from an object positioned in front of the processor, relative speed to an object detected from an image, and a distance between a plurality of objects using a disparity difference detected from a stereo image.

The front camera module 126a may include a time of flight (TOF) camera module. In this case, the camera module 126 may include a light source (e.g., an infrared lamp or a laser) and a receiver. In this case, the processor of the front camera module 126a may detect a distance from an object in front of the processor, relative speed to the object, and a distance between a plurality of objects based on TOF between reflection by the object and reception of infrared light or laser emitted from a light source.

When the front camera module 126a is a mono camera module, the front camera module 126a may detect a distance and relative speed to an object in front of the front camera module 126a according to time based on the size of the object.

The surrounding view camera module 126b may include a plurality of camera modules. For example, the plurality of camera modules may be disposed to the left of, behind, to the right of, and in front of the autonomous vehicle.

The left camera module may be disposed in a case surrounding a left side mirror. Alternatively, the left camera module may be disposed in one region outside a left front door, a left rear door, or a left fender.

The right camera module may be disposed in a case surrounding a right side mirror. Alternatively, the right camera module may be disposed in one region outside a right front door, a right rear door, or a right fender.

The rear camera may be may be disposed in the vicinity of a rear license plate, a trunk, or a tailgate.

The front camera module may be disposed in the vicinity of an emblem or a radiator grill.

An image captured by each of the plurality of camera modules may be transmitted to a processor of the camera module 126b, and the processor may synthesize the images to generate a surroundings image of the autonomous vehicle. In this case, the surroundings image of the autonomous vehicle may be displayed as a top view image or a bird's eye view image through the display 141.

The interior camera module 126c may photograph the interior of the autonomous vehicle 100. The interior camera module 126c may acquire an image of a passenger.

The processor of the interior camera module 126c may acquire the image of the passenger in the autonomous vehicle 100 and detect information about the number of passengers and seats of the respective passengers. For example, the interior camera module 126c may detect whether there is a passenger and a passenger seat.

The interior camera module 126c may acquire an image for biometrics of a passenger. The processor of the interior camera module 126c may check identification (ID) of a passenger based on a face image of the passenger.

In some cases, the processor of the interior camera module 126c may detect a type of the passenger based on the image of the passenger. For example, the processor of the interior camera module 126c may detect whether a driver is elderly, disabled, or pregnant through a predetermined image processing algorithm.

The rear camera module 126d may include a stereo camera module. In this case, the processor of the camera module 126d may detect a distance from an object behind the processor, relative speed to an object detected from an image, and a distance between a plurality of objects using a disparity difference detected from a stereo image.

The rear camera module 126d may include a time of flight (TOF) camera module. In this case, the camera module 126 may include a light source (e.g., an infrared lamp or a laser) and a receiver. In this case, the processor of the camera module 126a may detect a distance from an object behind the processor, relative speed to the object, and a distance between a plurality of objects based on TOF between reflection by the object and reception of infrared rays or laser emitted from a light source.

When the rear camera module 126d is a mono camera module, the rear camera module 126d may detect a distance and relative speed to an object behind the rear camera module 126d according to time based on the size of the object.

An objected detected from an ultrasonic sensor, a radar, or a lidar may be matched with an object detected from an image acquired by the camera module 126 and may be used.

The memory 130 may be electrically connected to the controller 170. The memory 130 may store basic data about a unit, control data for control of an operation of the unit, and input and output data. The memory 130 may include various storage devices such as a ROM, a RAM, an EPROM, a flash driver, and a hard drive, among others, in terms of hardware. The memory 130 may store various data items for an overall operation of the autonomous vehicle 100, such as a program for processing or control of the controller 170.

The output unit 140 may be used to output information processed by the controller 170 and may include the display 141, a sound output unit 142, and a haptic output unit 143.

The display 141 may display information processed by the controller 170. For example, the display 141 may display information associated with autonomous vehicle. Here, the information associated with the autonomous vehicle may include autonomous vehicle control information for direct control of the autonomous vehicle or driving assistance information of an autonomous vehicle for driving guidance for a driver of the autonomous vehicle. In addition, the information associated with the autonomous vehicle may include autonomous vehicle state information indicating a current state of the autonomous vehicle or autonomous vehicle driving information associated with driving of the autonomous vehicle.

The display 141 may include at least one of a liquid crystal display (LCD), a thin film transistor-liquid crystal display (TFT LCD), an organic light-emitting diode (OLED), a flexible display, a three-dimensional (3D) display, and an e-ink display, among others.

The display 141 may include an interlayer structure along with a touch sensor or may be integrated with the touch sensor so as to form a touchscreen. The touchscreen may function as a user input unit 724 providing an input interface between the autonomous vehicle 100 and a user and may simultaneously provide an output interface between the autonomous vehicle 100 and the user. In this case, the display 141 may include a touch sensor for detection of touch on the display 141 so as to input a control command in a touch manner. When the display 141 is touched using the touch sensor, the touch sensor may detect the touch, and the controller 170 may be configured to generate a control command corresponding to the touch based on the detected touch. Data input in a touch manner may be a character, a number, a menu item that is indicated or can be indicated in various modes, or the like.

The display 141 may include a cluster such that a driver drives and simultaneously checks autonomous vehicle state information or autonomous vehicle driving information. The cluster may be positioned on a dashboard. In this case, the driver may check information displayed on the cluster while his or her eyes are kept on the front of the autonomous vehicle.

In some cases, the display 141 may be in the form of a head up display (HUD). When the display 141 is a HUD, information may be output through a transparent display included in a windshield. Alternatively, the display 141 may include a projection module so as to output information through an image projected onto the windshield.

In some cases, the display 141 may include a transparent display. In this case, the transparent display may be attached to the windshield.

The transparent display may display a predetermined image while having predetermined transparency. The transparent display may include at least one of a thin film electroluminescent (TFEL) display, a transparent organic light-emitting diode (OLED) display, a transparent liquid crystal display (LCD), a transmissive transparent display, and a transparent light emitting diode (LED) display so as to have transparency. The transparency of the transparent display may be adjustable.

The sound output unit 142 may convert an electrical signal from the controller 170 into an audio signal and output the audio signal. To this end, the sound output unit 142 may include a speaker and so on. The sound output unit 142 may output sound corresponding to an operation of the user input unit 724.

The haptic output unit 143 may generate haptic output. For example, the haptic output unit 143 may vibrate a steering wheel, a safety belt, and a seat such that a user recognizes output.

The vehicle driver 150 may control operations of various devices of the autonomous vehicle. The vehicle driver 150 may include a power source driver 151, a chassis driver 152, a lamp driver 154, an air conditioning driver 155, a window driver 156, an air bag driver 157, and a sunroof driver 158.

The power source driver 151 may perform electronic control of a power source of the autonomous vehicle 100.

For example, when a fossil fuel-based engine is a power source, the power source driver 151 may perform electronic control of the engine. As such, output torque and so on of the engine may be controlled. When the power source driver 151 is an engine, engine output torque may be limited to limit speed of autonomous vehicle under control of the controller 170.

As another example, when an electricity-based motor is a power source, the power source driver 151 may control the motor. As such, rotation speed of the motor, torque, and so on may be controlled.

The chassis driver 152 may perform electronic control of steering, braking, and a suspension of the autonomous vehicle. The chassis driver 152 may also steer the autonomous vehicle 100.

In some cases, the chassis driver 152 may perform electronic control of a brake apparatus in the autonomous vehicle 100. For example, an operation of a brake disposed at a wheel may be controlled to reduce speed of the autonomous vehicle 100. As another example, operations of brakes disposed at a left wheel and a right wheel may be different so as to steer the autonomous vehicle 100 to the left or right side.

In some cases, the chassis driver 152 may perform electronic control of a suspension apparatus in the autonomous vehicle 100. For example, when a road surface is rough, the suspension apparatus may be controlled to reduce vibration of the autonomous vehicle 100.

The lamp driver 154 may control turn on/turn off of a lamp disposed inside or outside the autonomous vehicle. In addition, the intensity and direction of light of a lamp may be controlled. For example, a direction indication lamp, a brake lamp, and so on may be controlled.

The air conditioning driver 155 may perform electronic control of an air conditioner in the autonomous vehicle 100. For example, when temperature in the autonomous vehicle is high, the air conditioner may be operated to be controlled to supply cool air into the autonomous vehicle.

The window driver 156 may perform electronic control of a window apparatus in the autonomous vehicle 100. For example, opening and closing of right and left windows of lateral surfaces of the autonomous vehicle may be controlled.

The air bag driver 157 may perform electronic control of an airbag apparatus in the autonomous vehicle 100. For example, the air bag driver 157 may control an airbag to deploy in case of danger.

The sunroof driver 158 may perform electronic control of a sunroof apparatus in the autonomous vehicle 100. For example, opening and closing of the sunroof may be controlled.

The controller 170 may control an overall operation of each unit in the autonomous vehicle 100. The controller 170 may be referred to as an electronic control unit (ECU).

The controller 170 may include at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units, among others, for performing other functions in terms of hardware.

The controller 170 may receive driving mode input through the user input unit 124. The driving mode may be any one of a time mode for driving to a set destination, a fuel efficiency mode, a safety mode, and a comfort mode.

According to a selected mode, the controller 170 may perform a control operation.

In detail, the controller 170 may control the vehicle driver 150 to drive the autonomous vehicle 100 to a set destination according to the selected mode.

According to the selected mode, the controller 170 may control the power source driver 151. In detail, according to the selected mode, the controller 170 may control an operation of a turbo supercharger. For example, the controller 170 may control the power source driver 151 to turn on or off a supercharger or a turbocharger according to the selected mode. When high engine output is required, if speed of the autonomous vehicle 100 is equal to or less than reference speed, the controller 170 may turn on the supercharger and turn off the turbocharger. This is because the supercharger is advantageous at low speed due to turbo-lag. When high engine output is required, if speed of the autonomous vehicle 100 is greater than reference speed, the controller 170 may turn off the supercharger and turn on the turbocharger. This is because the turbocharger may be advantageous at high speed in terms of energy efficiency.

An engine 510 (see FIG. 5) may include a throttle valve. The controller 170 may control the throttle valve according to a selected mode. In detail, when high engine output is required, the controller 170 may open the throttle valve according to a required output degree to enhance engine output according to the selected mode. On the other hand, when engine output is not required, the throttle value may be closed to prevent unnecessary waste of energy.

The controller 170 may control the power source driver 151 based on information about a path leading to a destination, which is provided from the display device 200 for providing a navigation function. For example, when the path contains a right turn or a left turn, a supercharger may be controlled to be turned on immediately after the right turn or the left turn. When current speed is equal to or greater than reference speed, the supercharger may be controlled to be turned off and the turbocharger may be controlled to be turned on. For example, when the path contains an uphill slope, the supercharger or the turbocharger may be controlled to be turned on before a vehicle reaches the uphill slope.

The controller 170 may receive object information from the camera module 126. The controller 170 may control the power source driver 151 based on the object information provided from the camera module 126.

For example, the camera module 126 may detect an uphill slope, a downhill slope, or a curve in the road. Information about the detected uphill slope, downhill slope, or curve of the driving road may be provided to the controller 170. The controller 170 may control the power source driver 151 based on the information about the uphill slope, the downhill slope, or the curve.

For example, when the uphill slope is detected, the controller 170 may control the supercharger or the turbocharger to be turned on.

For example, when the downhill slope is detected, the controller 170 may control the supercharger or the turbocharger to be turned off.

For example, when the curve is detected, the controller 170 may control the supercharger or the turbocharger to be turned off before a vehicle reaches the curve and control the supercharger or the turbocharger to be turned on after the vehicle reaches the curve.

The controller 170 may control steering, brake, and suspension according to the selected mode. For example, the controller 170 may control the chassis driver 152 according to a selected mode, with the chassis driver 152 controlling steering, brake, and suspension.

The controller 170 may control the pneumatic management unit 210 or the lift management unit 220 according to the selected mode.

In some cases, the controller 170 may control the pneumatic management unit 210 according to the selected mode to raise or lower tire pneumatic.

In some cases, the controller 170 may control the lift management unit 220 according to the selected mode to adjust a spoiler.

When a time mode is selected as a driving mode, the controller 170 may control at least one of the power source driver 151, the chassis driver 152, the pneumatic management unit 210, and the lift management unit 220 based on the selected time mode. The controller 170 may provide a user interface (UI) appropriate for the time mode through the display 141 or the display device 200 based on the selected time mode.

Hereinafter, an example operation of the controller 170 in the case of selection of a time mode will be described.

The controller 170 may receive a target arrival time or target driving time input through the display device 200.

In response to the target arrival time or the target driving time input being received, the controller 170 may control a vehicle to be driven according to the target arrival time or the target driving time.

The controller 170 may receive navigation information from the display device 200. Here, the navigation information may include information of a set destination, at least one path information item according to the destination, map information associated with vehicle driving, and current position information of the vehicle. The navigation information may include position information about a vehicle on a road.

The controller 170 may control the vehicle to be driven along a path with a minimum occurrence of traffic lights or intersections among a plurality of paths to a destination. As the number of traffic lights or intersections is increased, longer time may be needed for travel. Accordingly, the vehicle may be driven along a path with a minimum of traffic lights or intersections, thereby reducing driving time.

The controller 170 may control at least one of acceleration, deceleration, steering, tire pneumatic, suspension, and lift such that a vehicle arrives at a set destination within minimum time, target arrival time, or target driving time.

When a fuel efficiency mode is selected as a driving mode, the controller 170 may control at least one of the power source driver 151, the chassis driver 152, the pneumatic management unit 210, and the lift management unit 220 based on the selected fuel efficiency mode. The controller 170 may provide a user interface (UI) appropriate for the fuel efficiency mode through the display 141 or the display device 200 based on the selected fuel efficiency mode.

Hereinafter, an example operation of the controller 170 in the case of selection of a fuel efficiency mode will be described.

The controller 170 may receive target fuel-efficiency input for driving to a destination through the display device 200.

In response to target fuel-efficiency input being received, the controller 170 may control a vehicle according to target fuel efficiency.

The display device 200 may display a screen image containing a scroll bar for target fuel efficiency input. The controller 170 may control the vehicle to be driven according to target fuel efficiency based on input through the scroll bar.

The controller 170 may control the vehicle to be driven while maintaining speed set to be appropriate for fuel efficiency when the fuel efficiency mode is selected. For example, the controller 170 may select a path that allows the vehicle to be driven while maintaining speed set to be appropriate for fuel efficiency among a plurality of paths up to a destination. Here, the path may be a path with a minimum of traffic lights. For example, the controller 170 may control the vehicle to pass by a traffic light that outputs a Go signal based on a time point when the vehicle approaches a traffic light, based on the received signal information of the traffic light through the communication unit 110.

The controller 170 may control at least one of acceleration, deceleration, steering, tire pneumatic, suspension, and lift such that the vehicle is driven up to the set destination while maintaining target fuel efficiency.

When a safety mode is selected as a driving mode, the controller 170 may control at least one of the power source driver 151, the chassis driver 152, the pneumatic management unit 210, and the lift management unit 220 based on the selected safety mode. The controller 170 may provide a user interface (UI) appropriate for the safety mode through the display 141 or the display device 200, based on the selected safety mode.

Hereinafter, an operation of the controller 170 in the case of selection of a safety mode will be described.

The controller 170 may control a vehicle based on at least one of information items of traffic congestion, steering, acceleration or deceleration, a safe distance, and an accident history.

The controller 170 may control the vehicle to be driven along a path with lowest traffic congestion among a plurality of paths to a destination. As traffic congestion is lowered, probability of traffic accidents may be lowered. Accordingly, in the case of selection of the safety mode, the vehicle may be driven along a path with low traffic congestion, thereby providing safer driving conditions to a user.

In some cases, the controller 170 may control the vehicle to be driven along a path with a minimum occurrence of steering, acceleration, or deceleration among a plurality of paths to a destination. As the number of times that steering, acceleration, or deceleration occurs is decreased, the amount of vehicle control may be lowered, and accordingly, probability of traffic accidents may be lowered. Accordingly, in the case of selection of the safety mode, the vehicle may be controlled to be driven along the path that minimizes steering, acceleration, or deceleration, thereby providing safer driving conditions to a user. Here, one or more of steering, acceleration, and deceleration may be minimized.

In some cases, the controller 170 may control the vehicle to be driven while maintaining a safe distance from a leading vehicle to a preset distance or more. The vehicle may be driven while maintaining a safe distance from a leading vehicle so as to ensure time for responding to an incident, thereby providing safer driving conditions to a user.

The controller 170 may control the vehicle to be driven along a path with lowest accident history among a plurality of paths to a destination. Probability of traffic accidents is high in a section in which accidents frequently occur, and thus the vehicle may be driven along the path with lowest accident history, thereby providing safer driving conditions to a user.

The display device 200 may display a screen image for receiving setting input of section information containing traffic congestion, steering, acceleration or deceleration, a safe distance, and accident history, among others. When the user input unit 124 and the display device 200 are integrated with each other, the controller 170 may receive setting input corresponding to the section information containing traffic congestion, steering, acceleration or deceleration, a safe distance, and accident history, through the display device 200. The controller 170 may control the vehicle according to the received setting input.

The controller 170 may control at least one of acceleration, deceleration, steering, tire pneumatic, suspension, and lift, for driving to a set destination in a safety mode.

When a comfort mode is selected as a driving mode, the controller 170 may control at least one of the power source driver 151, the chassis driver 152, the pneumatic management unit 210, and the lift management unit 220 based on the selected comfort mode. The controller 170 may provide a user interface (UI) appropriate for the comfort mode through the display 141 or the display device 200, based on the selected comfort mode.

Hereinafter, an example operation of the controller 170 in the case of selection of the comfort mode will be described.

The controller 170 may control the vehicle to be driven along a path with a minimum occurrence of one or more of speed bumps, curves, uphill slopes, and downhill slopes among a plurality of paths to a destination. As the number of speed bumps, curves, uphill slopes, and downhill slopes on a path is increased, a user may experience inconvenience. Accordingly, in the case of selection of the comfort mode, the vehicle may be controlled to be driven along a path that minimizes one or more of speed bumps, curves, uphill slopes, and downhill slopes, thereby providing improved comfort during driving.

In some cases, the controller 170 may control the vehicle to be driven along a path with a low number of times of predicted steering, acceleration, or deceleration among a plurality of paths to a destination. As the number of times of predicted steering, acceleration, or deceleration is increased, a user may experience inconvenience. Accordingly, in the case of selection of the comfort mode, the vehicle may be controlled to be driven along a path with a minimum of predicted steering, acceleration, or deceleration, thereby providing comfort during driving. Here, one or more of predicted steering, acceleration, or deceleration may be minimized.

The controller 170 may control the output unit 140 to provide driving information to a user according to the selected mode. In this case, the driving information may be provided to the display device 200.

The interface unit 180 may function as an interface with various types of external devices connected to the autonomous vehicle 100. For example, the interface unit 180 may include a port connectable to the mobile terminal 270 and may be connected to the mobile terminal 270 through the port. In this case, the interface unit 180 may exchange data with the mobile terminal 270.

In some cases, the interface unit 180 may function as an interface for supplying energy to the connected mobile terminal 270. For example, when the mobile terminal 270 is electrically connected to the interface unit 180, the interface unit 180 may supply electric energy supplied by the power supply unit 190 to the mobile terminal 270 under control of the controller 170.

The power supply unit 190 may supply power required for an operation of each component under control of the controller 170. In particular, the power supply unit 190 may receive power from a battery in the autonomous vehicle.

The display device 200 may be used as a human machine interface (HMI) between a user and a vehicle 700.

The display device 200 may provide a function of outputting audio and video contents. In addition, the display device 200 may provide a navigation function.

The display device 200 may receive user input.

The display device 200 may include a plurality of units so as to perform an HMI function.

The display device 200 may be configured to display an image on one region of a windshield.

The display device 200 may include a transparent display. In this case, the transparent display may be adhered to a windshield. Additionally, a vehicle display apparatus 400 may output information through the transparent display.

The transparent display may display a predetermined image while having predetermined transparency. The transparent display may include at least one of a thin film electroluminescent (TFEL) display, a transparent organic light-emitting diode (OLED) display, a transparent liquid crystal display (LCD), a transmissive transparent display, and a transparent light emitting diode (LED) display so as to have transparency.

The transparency of the transparent display may be adjustable.

The display device 200 may include a projection module. In this case, the display device 200 may output information through an image projected onto the windshield.

The projection module may project a beam toward the windshield. The projection module may include a light source and a transmissive lens. That is, the projection module may form an image using light generated by a light source, and the formed image may be projected onto the windshield. In this case, the light source may be a light emitting diode (LED), a laser, or the like.

The display device 200 may receive destination input.

The display device 200 may receive driving mode selection input. For example, the display device 200 may receive mode selection input of any one of a time mode, a fuel efficiency mode, a safety mode, and a comfort mode, for driving to a set destination.

The display device 200 may display an image for inputting target arrival time or target driving time. For example, the display device 200 may receive the target arrival time or the target driving time through touch input. For example, the image may include a time input window, and the target arrival time or the target driving time may be received through the time input window. For example, the image may include a scroll bar, and the target arrival time or the target driving time input may be received through scroll movement of a scroll bar.

In response to the target arrival time or the target driving time to a destination being input, the display device 200 may display whether the vehicle is capable of arriving at the destination within the target destination time or the target driving time.

The display device 200 may display an image for inputting target fuel efficiency. For example, the display device 200 may receive target fuel efficiency through touch input. For example, the image may include a fuel efficiency input window, and target fuel efficiency input may be received through the fuel efficiency input window. For example, the image may include a scroll bar, and the target fuel efficiency input may be received through scroll movement of the scroll bar.

The pneumatic management unit 210 may manage a tire's pneumatic conditions. For example, the pneumatic management unit 210 may control the vehicle to raise or lower the pneumatic pressure during driving. The pneumatic pressure may be raised or lowered so as to enhance or reduce tire grip, for instance.

The lift management unit 220 may manage lift applied to the autonomous vehicle 100. The lift management unit 220 may adjust, for example, a spoiler installed in the autonomous vehicle 100. The spoiler may be adjusted to reduce lift applied to the autonomous vehicle 100.

Figure 3:
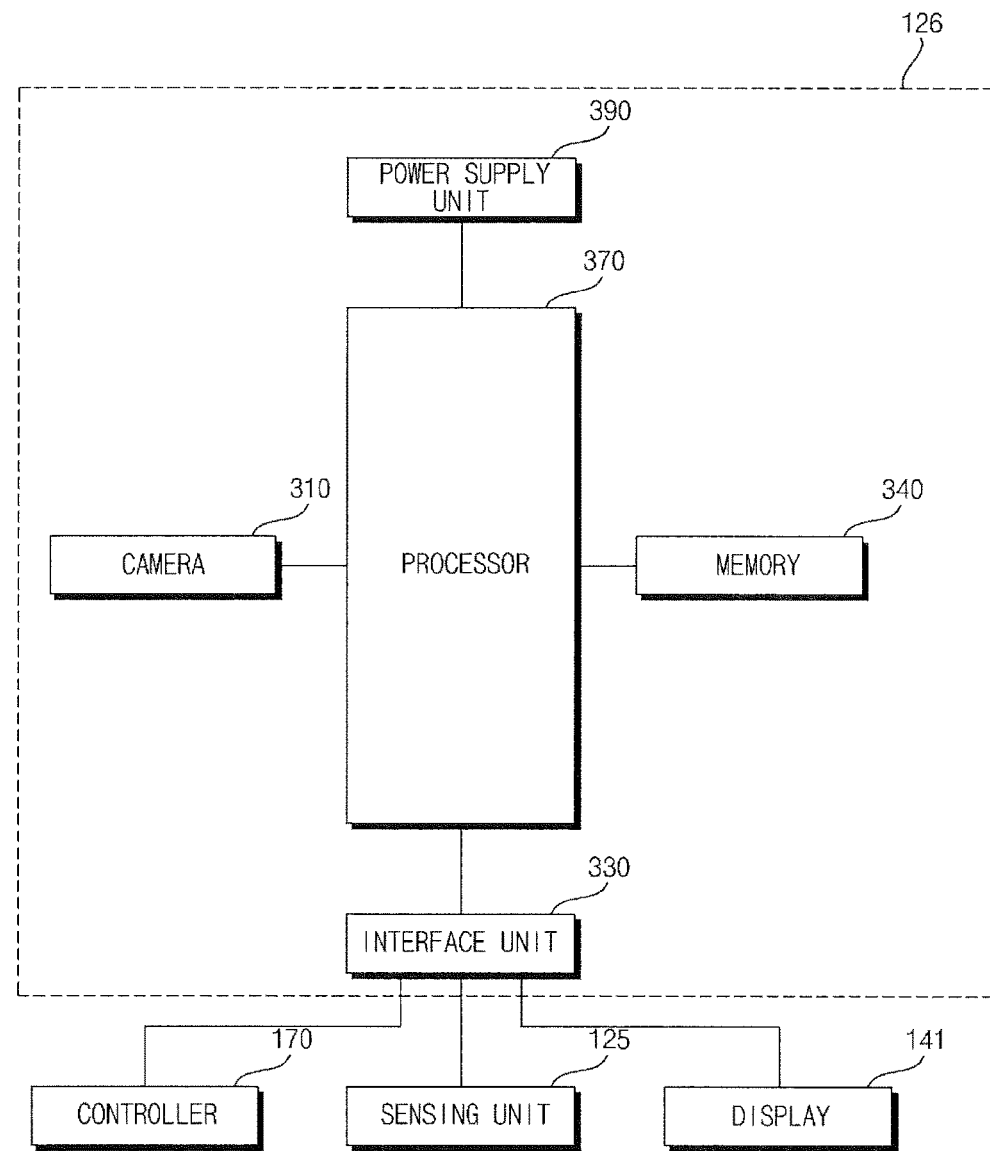
FIG. 3 is a diagram illustrating an example camera module.

FIG. 3 is a diagram showing the camera module 126 according to one implementation.

Referring to FIG. 3, the camera module 126 may perform signal-processing of an image received from a camera 310 based on a computer vision to generate driving environment information.

The camera module 126 may include the camera 310, an interface unit 330, a memory 340, a processor 370, and a power supply unit 390.

The camera 310 may be a mono camera. Alternatively, the camera 310 may be a stereo camera. In some cases, the camera 310 may be a surrounding view camera.

The camera 310 may acquire a vehicle front image, a vehicle surroundings image, a vehicle inner image, and a vehicle rear image according to a mounted location of the camera 310.

The camera 310 may acquire an image. The camera 310 may include a lens and an image sensor (e.g., CMOS or CCD) for image acquisition.

The interface unit 330 may exchange data with another device in the autonomous vehicle. The interface unit 330 may receive data associated with the vehicle or may externally transmit a signal processed or generated by the processor 370. To this end, the interface unit 330 may perform data communication with the controller 170, the sensing unit 125, the display 141, and so on in the vehicle in a wired or wireless communication manner.

The interface unit 330 may receive navigation information through data communication with the controller 170 or a separate navigation device. Here, the navigation information may include information of a set destination, information of at least one path according to the destination, map information associated with vehicle driving, and current position information of the vehicle. The navigation information may include position information about a vehicle on a road.

The interface unit 330 may receive sensor information from the controller 170 or the sensing unit 125.

Here, sensor information may include at least one of vehicle direction information, vehicle position information (GPS information), vehicle angle information, vehicle speed information, vehicle acceleration information, vehicle inclination information, vehicle driving/reverse information, battery information, fuel information, tire information, vehicle lamp information, vehicle interior temperature information, and vehicle interior humidity information.

The sensor information may be acquired from a heading sensor, a yaw sensor, a gyro sensor, a position module, a vehicle driving/reverse sensor, a wheel sensor, a vehicle speed sensor, a vehicle slope detection sensor, a battery sensor, a fuel sensor, a tire sensor, a steering sensor by handle rotation, a vehicle interior temperature sensor, a vehicle interior humidity sensor, and so on. The position module may include a GPS module for receiving GPS information.

Among the sensor information items, vehicle direction information, vehicle position information, vehicle angle information, vehicle speed information, vehicle slope information, and so on, which are associated with vehicle driving may be referred to as vehicle driving information.

The interface unit 330 may receive turn signal information. Here, the turn signal information may be a turn on signal of a direction indication lamp for right turn or left turn, input by a user. In response to turn-on input of a right or left direction indication lamp being received through the user input unit 124 of the vehicle, the interface unit 330 may receive the turn signal information for right turn or left turn.

The interface unit 330 may receive vehicle speed information, rotation angle information of a steering wheel, or gear shift information. The interface unit 330 may receive vehicle speed information, steering wheel rotation angle information, or gear shift information, which is sensed through the sensing unit 125 of the vehicle. The interface unit 330 may receive vehicle speed information, steering wheel rotation angle information, or gear shift information from the controller 170 of the vehicle. Here, the gear shift information may be information about a state of a gear shift of the vehicle. For example, the gear shift information may be information of a state of the gear shift, among parking P, reverse R, neutral N, driving D, and first to multi-state gear states.

The interface unit 330 may receive user input received through the user input unit 124 of the vehicle 700. The interface unit 330 may receive the user input from an input unit 720 of the vehicle 700 or through the controller 170.

The interface unit 330 may receive information acquired from the external server 280. The external server 280 may be a server positioned in a traffic control center for controlling traffic. For example, in response to traffic light change information being received through the external server 280 through the communication unit 110, the interface unit 330 may receive the traffic light change information from the controller 170. The memory 340 may store programs for processing or controlling the processor 370, various data items for an overall operation of the camera module 126, and so on.

The memory 340 may store data for verifying an object. For example, in response to a predetermined object being detected from an image acquired through the camera 310, the memory 340 may store data for verifying the object via a predetermined algorithm.

The memory 340 may store data about traffic information. For example, in response to predetermined traffic information being detected from the image acquired through the camera 310, the memory 340 may store data for verifying the traffic information through a predetermined algorithm.

The memory 340 may be various storage devices such as a ROM, a RAM, an EPROM, a flash drive, and a hard drive in terms of hardware.

The processor 370 may control an overall operation of each unit of the camera module 126.

The processor 370 may process image acquired by the camera 310. For example, the processor 370 may perform signal-processing based on a computer vision. Accordingly, the processor 370 may acquire an image from the camera 310 and perform object detection and object tracking based on the image. For example, the processor 370 may perform lane detection (LD), vehicle detection (VD), pedestrian detection (PD), brightspot detection (BD), traffic sign recognition (TSR), traffic surface detection, and so on during detection of an object.

A traffic sign may refer to predetermined information to be transmitted to a driver of the vehicle 700. The traffic sign may be transmitted to the driver through a traffic light, a traffic mark, or a road surface. For example, the traffic sign may be a Go or Stop sign of a vehicle or a pedestrian, output from a traffic light. For example, the traffic signal may be various designs or texts indicated on the traffic mark. For example, the traffic sign may be various designs or texts indicated on the road surface.

The processor 370 may detect information from an image acquired by the camera 310.

The information may be information about a vehicle driving situation. For example, the information may be interpreted as including information of a road on which a vehicle drives, traffic rule information, surrounding vehicle information, vehicle or pedestrian traffic light information, construction information, traffic situation information, traffic log information, traffic lane information, and so on.

The information may be traffic information. The processor 370 may detect traffic information from any one of a traffic light, a traffic mark, and a road surface, contained in the image acquired by the camera 310. For example, the processor 370 may detect a Go or Stop signal of a vehicle or pedestrian, from a traffic light contained in an image. For example, the processor 370 may detect various designs or texts from a traffic mark contained in the image. For example, the processor 370 may detect various designs or texts from a road surface contained in the image.

The processor 370 may compare the detected information with information stored in the memory 340 to check information.

For example, the processor 370 may detect a design or text indicating a lamp way from an object contained in the acquired image. Here, the object may be a traffic mark or a road surface. The design or the text may be detected. The processor 370 may compare traffic information stored in the memory 340 with the detected design or text to check lamp way information.

For example, the processor 370 may detect a design or text indicating stop of a vehicle or pedestrian from an object contained in the acquired image. Here, the object may be a traffic mark or a road surface. The processor 370 may compare traffic information stored in the memory 340 with the detected design or text to verify Stop information. In addition, the processor 370 may detect a stop line from the road surface contained in the acquired image. The processor 370 may compare the traffic information stored in the memory 340 with a stop link to check stop information.

For example, the processor 370 may detect whether there is a traffic lane from the object contained in the acquired image. Here, the object may be a road surface. The processor 370 may check color of the detected traffic lane. The processor 370 may check whether the detected traffic lane is a driving lane or a standby lane.

For example, the processor 370 may detect Go or Stop information from the object contained in the acquired image. Here, the object may be a vehicle traffic sign. Here, the Go information of the vehicle may be a signal indicting driving, left turn, or right turn of the vehicle. The Stop information of the vehicle may be a signal indicating stop of the vehicle. The Go information of the vehicle may be indicated with green color and the Stop information of the vehicle may be indicated with red color.

For example, the processor 370 may detect Go or Stop information of a pedestrian from the object contained in the acquired image. Here, the object may be a traffic light of a pedestrian. Here, the Go information of the pedestrian may be a signal for allowing a pedestrian to traverse pedestrian crossing. The Stop information of the pedestrian may be a signal indicating stop of a pedestrian on pedestrian crossing.

The processor 370 may receive weather information and traffic situation information of a road, for example, transport protocol expert group (TPEG) information through the communication unit 110.

The processor 370 may recognize vehicle surrounding traffic situation information recognized based on a stereo image by the camera module 126, in real time.

The processor 370 may receive navigation information and so on through the interface unit 330.

The processor 370 may receive sensor information from the controller 170 or the sensing unit 125 through the interface unit 330. Here, the sensor information may include at least one of vehicle direction information, vehicle position information (GPS information), vehicle angle information, vehicle speed information, vehicle acceleration information, vehicle slope information, vehicle driving/reverse information, battery information, fuel information, tier information, vehicle lamp information, vehicle interior temperature information, vehicle interior humidity information, and steering wheel rotation information.

The processor 370 may include at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The processor 370 may be controlled by the controller 170.

The power supply unit 390 may receive power required for an operation of each component under control of the processor 370. For example, the power supply unit 390 may receive power from a battery and so on in the vehicle.

The camera module 126 may include a separate user input unit, an output unit, and a communication unit.

The input unit may include an audio input unit. The output unit may include a display and an audio output unit. The communication unit may include a wireless communication module (e.g., a short-range communication module) for performing wireless communication with other devices.

Figure 4:
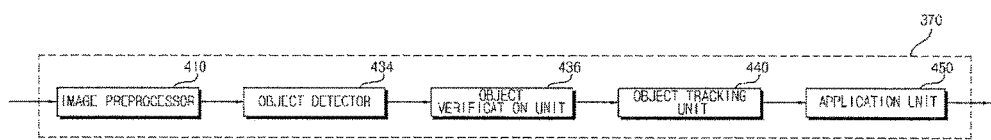
FIG. 4 is a detailed block diagram of an example processor of a camera module.

FIG. 4 is a block diagram of an example processor 370 of a camera module according to one implementation.

Referring to FIG. 4, the processor 370 may include an image preprocessor 410, an object detector 434, an object verification unit 436, an object tracking unit 440, and an application unit 450.

The image preprocessor 410 may receive an image from a camera 195 and perform preprocessing.

In some cases, the image preprocessor 410 may perform noise reduction, rectification, calibration, color enhancement, color space conversion (CSC), interpolation, camera gain control, and the like on the image. Accordingly, a clearer image than the image captured by the camera 195 may be acquired.

The object detector 434 may detect an object based on the image preprocessed by the image preprocessor 410.

Here, the object may be at least one of a traffic lane, other surrounding vehicles, a pedestrian, light, a traffic sign, a road surface, a tunnel, and an obstruction.

The object verification unit 436 may classify and verify a separated object.

To this end, the object verification unit 436 may use a verification method using a neural network, a support vector machine (SVM) scheme, a verification scheme via AdaBoost using Haar-like feature, or histograms of oriented gradients (HOG) scheme.

The object verification unit 436 may compare objects stored in the memory 340 with the detected object to verify the object.

For example, the object verification unit 436 may verify surrounding vehicles, a traffic lane, a road surface, a traffic mark, a dangerous area, a tunnel, and an obstruction, which are positioned around a vehicle.

The object tracking unit 440 may track the verified object. For example, objects in the acquired images may be sequentially verified, movement of the verified object or a motion vector may be calculated, and movement of the corresponding object may be tracked based on the calculated movement or motion vector. Accordingly, surrounding vehicles, a traffic lane, a road surface, a traffic mark, a dangerous area, a tunnel, and so on, which are positioned around the vehicle, may be tracked.

The application unit 450 may calculate a risk degree and so on of the autonomous vehicle 100 based on various objects, for example, other vehicles, a traffic lane, a road surface, and a traffic mark, which are positioned around the autonomous vehicle 100. In addition, the probability of collision with a leading vehicle, whether a vehicle slips, and so on may be calculated.

In addition, the application unit 450 may output a messages for indicating this information to a user based on the calculated risk degree, collision probability, or whether the vehicle slips. In addition, a control signal for posture control or driving control of the autonomous vehicle 100 may be generated.

Figure 5:
FIG. 5 is a block diagram illustrating an example power source driver.

FIG. 5 is a block diagram showing an example power source driver 151 according to one implementation.

Referring to FIG. 5, the power source driver 151 may be operated under control of the controller 170.

The power source driver 151 may control an engine 510. The power source driver 151 may control a supercharger or a turbocharger to be turned on or off according to the control signal of the controller 170. The controller 170 may control the power source driver 151 to turn on or off the supercharger or the turbocharger to be turned on or off according to information received through the sensing unit 125. The controller 170 may control the power source driver 151 to maximize advantages and minimize disadvantages of the supercharger or the turbocharger based on the information received through the sensing unit 125.

The engine 320 may include a turbo supercharger. Here, the turbo supercharger may include a supercharger or a turbocharger, or both.

The supercharger may be a turbo supercharger that receives power from an output axis of an engine, drives a compressor to compress air, and supplies the air to enhance output of the engine 320.

The supercharger may be advantageous in terms of providing quick reaction to a throttle and a high supercharging effect in a low rotation state.

On the other hand, the supercharger requires compressor driving and thus may be disadvantageous in terms of reduced engine efficiency and low output in high rotation compared with the turbocharger.

The turbocharger may be a turbo supercharger that rotates a turbine using a pressure of exhaust gas exploding out of a combustion chamber and rotates an impeller at inspiration using the turbine to enhance output of the engine 320.

The turbocharger uses the force of dumped exhaust gas and thus may be advantageous in terms of high output compared with a natural intake type engine and high thermal efficiency compared with a supercharger engine.

On the other hand, the turbocharger may be disadvantageous in terms of low efficiency and turbo-lag occurrence when the amount of exhaust gas is insufficient.

The controller 170 may control the power source driver 151 to turn on or off the supercharger and the turbocharger so as to compensate the advantage and disadvantage of the supercharger and the turbocharger.

For example, in the case of selection of a time mode, when speed of the autonomous vehicle 100 is reduced due to left turn, right turn, curve entrance, or uphill slope entrance and then is re-accelerated, the controller 170 may control a turbocharger to be turned off and a supercharger to be turned on when speed of the autonomous vehicle 100 is equal to or less than reference speed. Then when the speed of the autonomous vehicle 100 is greater than the reference speed, the controller 170 may control the supercharger to be turned off and the turbocharger to be turned on. By controlling likewise, turbo-lag may be prevented at low speed and fuel efficiency may be enhanced at high speed.

For example, in the case of selection of a fuel efficiency mode, the supercharger may be controlled to be turned off and the turbocharger may be controlled to be turned on, and uselessly dumped exhaust gas may be used to enhance engine output, thereby enhancing fuel efficiency.

For example, in the case of selection of a safety mode, when a vehicle enters a main road from a lamp way or changes a traffic lane after left turn and right turn, the supercharger or the turbocharger may be controlled to be turned on, thereby promoting safe driving according to speed based on driving flow of other vehicles.

Figure 6:
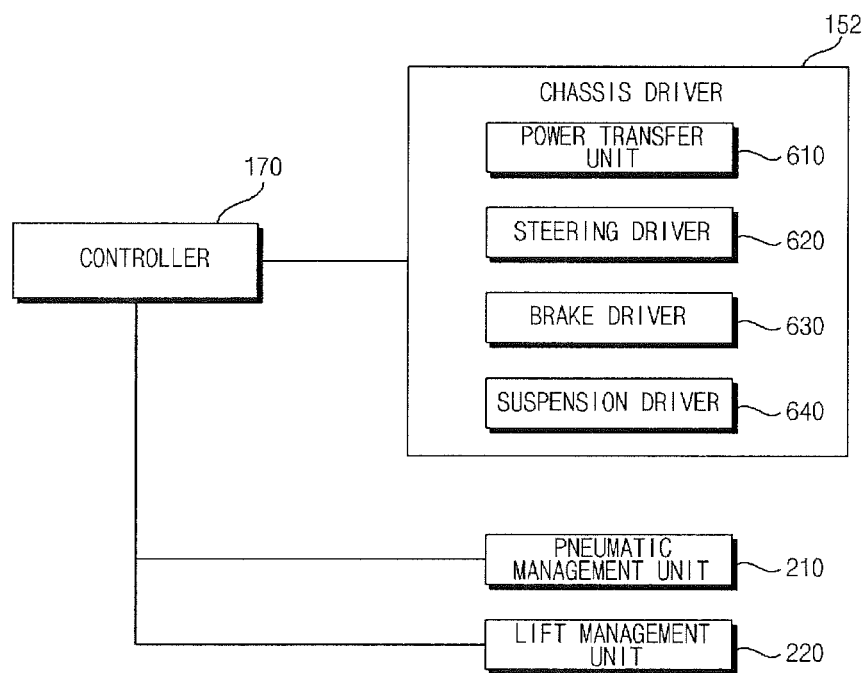
FIG. 6 is a block diagram illustrating an example chassis driver, a pneumatic management unit, and a lift management unit.

For example, in the case of selection of a comfort mode, the supercharger or the turbocharger may be controlled to be turned on during driving along an uphill slope so as to also maintain flatland driving speed in an uphill slope, thereby providing comfort FIG. 6 is an example block diagram illustrating the chassis driver 152, the pneumatic management unit 210, and the lift management unit 220.

Referring to FIG. 6, the chassis driver 152 may include a power transfer unit 610, a steering driver 620, a brake driver 630, and a suspension driver 640.

The power transfer unit 610 may transfer power generated by an engine to wheels 103FR, 103FL, 103RR, etc. (see FIG.

The steering driver 620 may steer the autonomous vehicle 100.

The brake driver 630 may perform electronic control of a brake apparatus in the autonomous vehicle 100. For example, an operation of a brake disposed at a wheel may be controlled to reduce speed of the autonomous vehicle 100. As another example, brakes disposed at a left wheel and a right wheel may be differently operated so as to steer the autonomous vehicle 100 to the left or the right.

The suspension driver 640 may perform electronic control of a suspension apparatus in the autonomous vehicle 100. For example, when a road surface is rough, the suspension apparatus may be controlled to reduce vibration of the autonomous vehicle 100.

The pneumatic management unit 210 may manage tire's pneumatic conditions. For example, the pneumatic management unit 210 may control the vehicle to raise or lower the tire's pneumatic pressure during driving. The pneumatic pressure may be raised or lowered so as to enhance or reduce tire grip, for instance.

The lift management unit 220 may manage lift applied to the autonomous vehicle 100. The lift management unit 220 may adjust a spoiler installed in the autonomous vehicle 100. The spoiler may be adjusted to reduce lift applied to the autonomous vehicle 100.

The chassis driver 152, the pneumatic management unit 210, and the lift management unit 220 may be controlled by the controller 170.

In the case of selection of a time mode, the controller 170 may control at least one of the power source driver 151, the steering driver 620, the brake driver 630, the pneumatic management unit 210, and the lift management unit 220 such that a vehicle arrives at a destination within minimum time or target arrival time.

In some cases, the controller 170 may perform steering so as to reduce driving time during driving to the destination under control of the steering driver 620. For example, the controller 170 may control the steering driver 620 to perform lane change, passing, and so on.

In some cases, the controller 170 may control the brake driver 630 to perform only necessary brake during driving to the destination. For example, the controller 170 may control to perform brake only when an accident is predictable based on information detected by the sensing unit 125.

In some cases, the controller 170 may control the pneumatic management unit 210 to control optimum tire pneumatic for enhancing driving speed.

In some cases, the controller 170 may control the pneumatic management unit 210 to minimize lift applied to the autonomous vehicle 100.

In addition, the controller 170 may control the lift management unit 220 to prevent fishtail during driving.

In the case of selection of a fuel efficiency mode, the controller 170 may control any one of the power source driver 151, the steering driver 620, the brake driver 630, the pneumatic management unit 210, and the lift management unit 220 such that a vehicle arrives a destination with target fuel efficiency.

In some cases, the controller 170 may control the steering driver 620 to perform only necessary steering during driving to the destination. For example, the controller 170 may control the steering driver 620 to maintain a driving lane without performing unnecessary lane change.

In some cases, the controller 170 may control the brake driver 630 to perform only necessary brake during driving to the destination. For example, the controller 170 may perform control to prevent unnecessary lane change or direction change.

In some cases, the controller 170 may control the suspension driver 640 to drive the vehicle with a lowered height to the destination.

In some cases, the controller 170 may control the pneumatic management unit 210 to drive the vehicle while maintaining tire pneumatic appropriate for driving with fuel efficiency.

In some cases, the controller 170 may control the lift management unit 220 to minimize lift applied to the autonomous vehicle 100.

In the case of selection of a safety mode, for safe driving to the destination, the controller 170 may control at least one of the power source driver 151, the steering driver 620, the brake driver 630, the pneumatic management unit 210, and the lift management unit 220.

In some cases, the controller 170 may control the steering driver 620 to prevent sudden steering except for the case in which an accident is predictable, based on information detected by the sensing unit 125.

In some cases, the controller 170 may control the brake driver 630 to prevent sudden braking except for the case in which an accident is predictable, based on the information detected by the sensing unit 125.

The controller 170 may control the brake driver 630 to change a braking degree of each wheel so as to prevent the autonomous vehicle 100 from slipping.

In some cases, the controller 170 may control the suspension driver 640 to change left and right heights of the vehicle during curve driving, left turn, and right turn so as to stably rotate the autonomous vehicle 100.

In some cases, the controller 170 may control the pneumatic management unit 210 to drive the vehicle while maintaining advantageous tire pneumatic for driving at high speed.

In some cases, the controller 170 may control the pneumatic management unit 210 to instantly reduce the tire pneumatic pressure and to enhance road grip so as to perform smooth braking during sudden braking.

When road friction force is low (e.g., snowy road or rainy road), the controller 170 may control the pneumatic management unit 210 to reduce tire pneumatic pressure so as to perform smooth braking.

In detail, the controller 170 may control the lift management unit 220 to prevent fishtail during driving.

In the case of selection of a comfort mode, the controller 170 may control at least one of the power source driver 151, the steering driver 620, the brake driver 630, the pneumatic management unit 210, and the lift management unit 220.

In some cases, the controller 170 may control the steering driver 620 to prevent sudden steering. In addition, the controller 170 may control the steering driver 620 to perform only necessary steering during driving to a destination.

In some cases, the controller 170 may control the brake driver 630 to prevent sudden braking. In addition, the controller 170 may control the steering driver 620 to perform only necessary steering during driving to a destination.

In some cases, the controller 170 may control the suspension driver 640 to change left and right heights of the vehicle during curve driving, left turn, and right turn so as to providing comfort during driving.

In some cases, the controller 170 may control the pneumatic management unit 210 to drive the vehicle while mainlining pneumatic for high ride-quality.

In some cases, the controller 170 may control the lift management unit 220 to prevent fishtail during driving.

Figure 7:
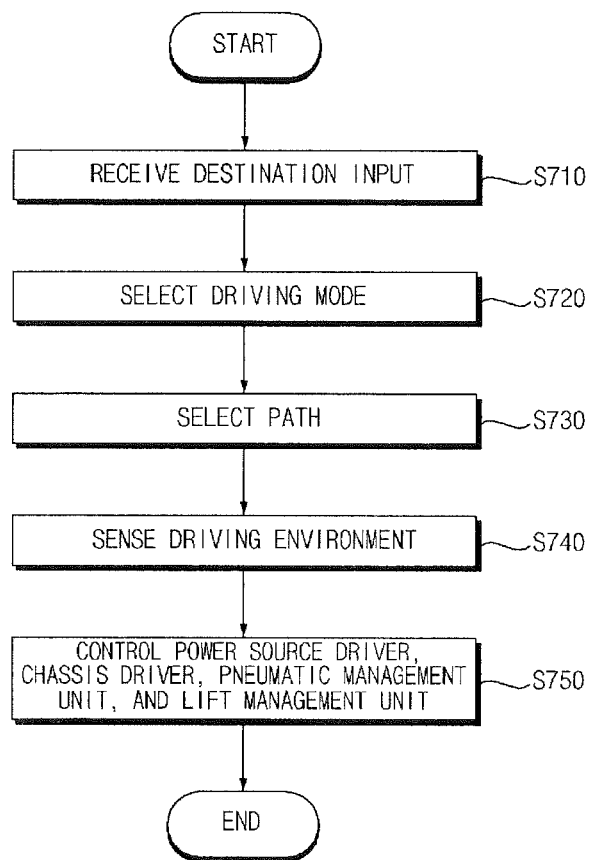
FIG. 7 is a flowchart illustrating an example operation of the autonomous vehicle.

FIG. 7 is a flowchart illustrating an example operation of an autonomous vehicle according to one implementation.

Referring to FIG. 7, the controller 170 may receive destination input through the user input unit 124 (S710). When the user input unit 124 and the display device 200 are integrated with each other, the controller 170 may receive the destination input through the display device 200.

After the destination input, the controller 170 may receive driving mode selection input through the user input unit 124 (S720). When the user input unit 124 and the display device 200 are integrated with each other, the controller 170 may receive the driving mode selection input through the display device 200.

A driving mode may be any one of a time mode, a fuel efficiency mode, a safety mode, and a comfort mode.

After the selection of the driving mode, the controller 170 may select a driving path to a destination according to the selected driving mode (S730).

The controller 170 may receive navigation information from the display device 200 for providing a navigation function. Here, the navigation information may include information of a set destination, information of at least one path according to the destination, map information associated with vehicle driving, and current position information of the vehicle. The navigation information may include position information about a vehicle on a road.

For example, in the case of selection of a time mode, the controller 170 may select a path appropriate for driving at high speed among a plurality of paths to the destination. Here, the path may be a path containing a highway. Alternatively, the path may be a path with a minimum of traffic lights or intersections.

For example, in the case of selection of a fuel efficiency mode, the controller 170 may select a path along which the vehicle is driven while maintaining set speed appropriate for fuel efficiency driving among a plurality of paths to the destination. Here, the path may be a path with a minimum of traffic lights, for instance.

In the case of selection of a safety mode, the controller 170 may select a path appropriate for safe driving among a plurality of paths to the destination. Here, the path may be a path with lowest traffic congestion. Alternatively, or additionally, the path may be a path with a minimum of steering, acceleration, or deceleration. Alternatively, or additionally, the path may be a path with lowest accident history.

In the case of selection of a comfort mode, the controller 170 may select a path appropriate for comfort driving among a plurality of paths to the destination. Here, the path may be a path with a minimum of speed bumps, curves, uphill slopes, and downhill slopes. Alternatively, the path may be a path with a low number of times of predicted steering, acceleration, or deceleration.

After path selection, the controller 170 may sense a driving environment during driving through the sensing unit 125 (S740).

Here, the driving environment may include a driving external environment of the autonomous vehicle 100 or a driving internal environment of the autonomous vehicle 100.

The controller 170 may sense the driving external environment through at least one of the camera module 126, an ultrasonic sensor, a radar, and a lidar.

The controller 170 may sense the driving internal environment of collision information of an autonomous vehicle, direction information of the autonomous vehicle, position information (GPS information) of the autonomous vehicle, angle information of the autonomous vehicle, speed information of the autonomous vehicle, acceleration information of the autonomous vehicle, inclination information of the autonomous vehicle, driving/reverse information of the autonomous vehicle, battery information, fuel information, tire information, lamp information of the autonomous vehicle, interior temperature information of the autonomous vehicle, interior humidity information of the autonomous vehicle, a steering wheel rotation angle, and external illumination of the autonomous vehicle through a collision sensor, a wheel sensor, a speed sensor, a slope sensor, a weight detection sensor, a heading sensor, a yaw sensor, a gyro sensor, a position module, a driving/reverse sensor of the autonomous vehicle, a battery sensor, a fuel sensor, a tire sensor, a steering sensor by handle rotation, an interior temperature sensor of the autonomous vehicle, an interior humidity sensor, and an illumination sensor.

Then the controller 170 may control at least one of the power source driver 151, the chassis driver 152, the pneumatic management unit 210, and the lift management unit 220 during driving along a selected path according to the selected driving mode (S750).

In some implementations, the controller 170 may control at least one of the power source driver 151, the chassis driver 152, the pneumatic management unit 210, and the lift management unit 220 in further consideration of the sensed driving environment.

FIGS. 8 to 13 are diagrams illustrating example operations of controlling the autonomous vehicle.

Figure 8:
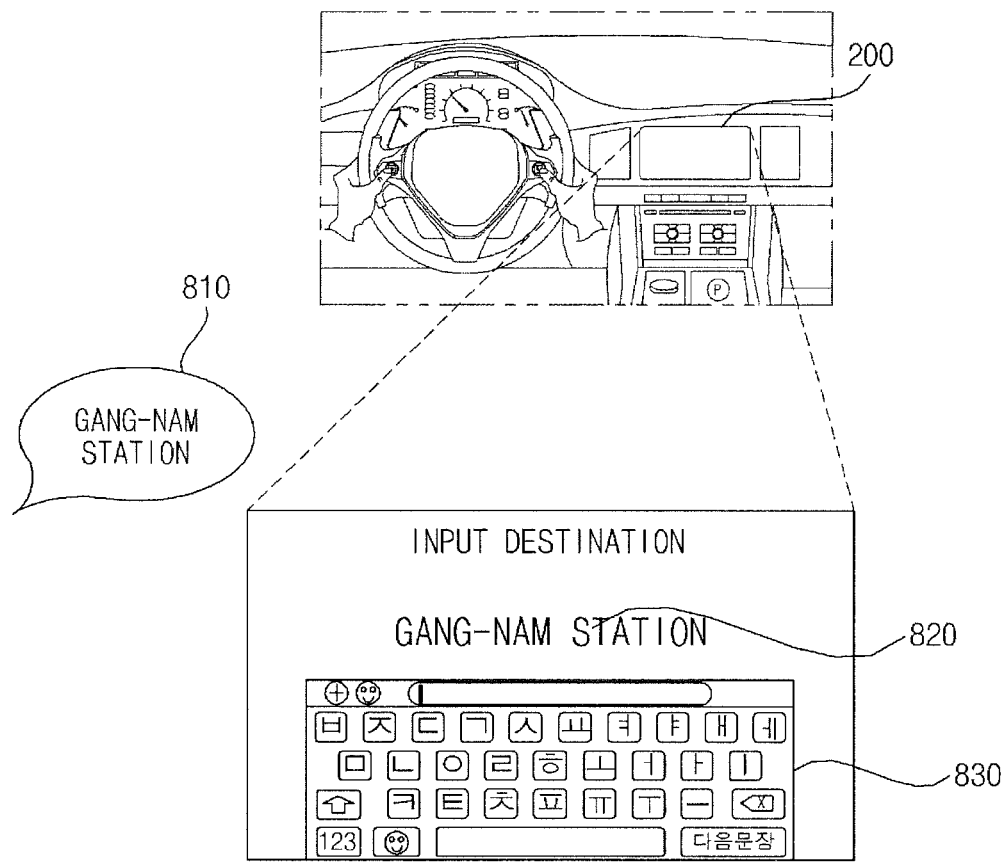
FIGS. 8 to 13 are diagrams illustrating example operations of controlling the autonomous vehicle.

As illustrated in FIG. 8, the controller 170 may receive destination input. The controller 170 may receive the destination input through the user input unit 124.

When the user input unit 124 and the display device 200 are integrated with each other, the controller 170 may receive the destination input through the display device 200. In this case, the controller 170 may input a destination 820 through a destination input unit 830 displayed on the display device 200. The destination input unit 830 may be a touchpad.

The controller 170 may receive user voice input 810 through the microphone 123.

Figure 9:
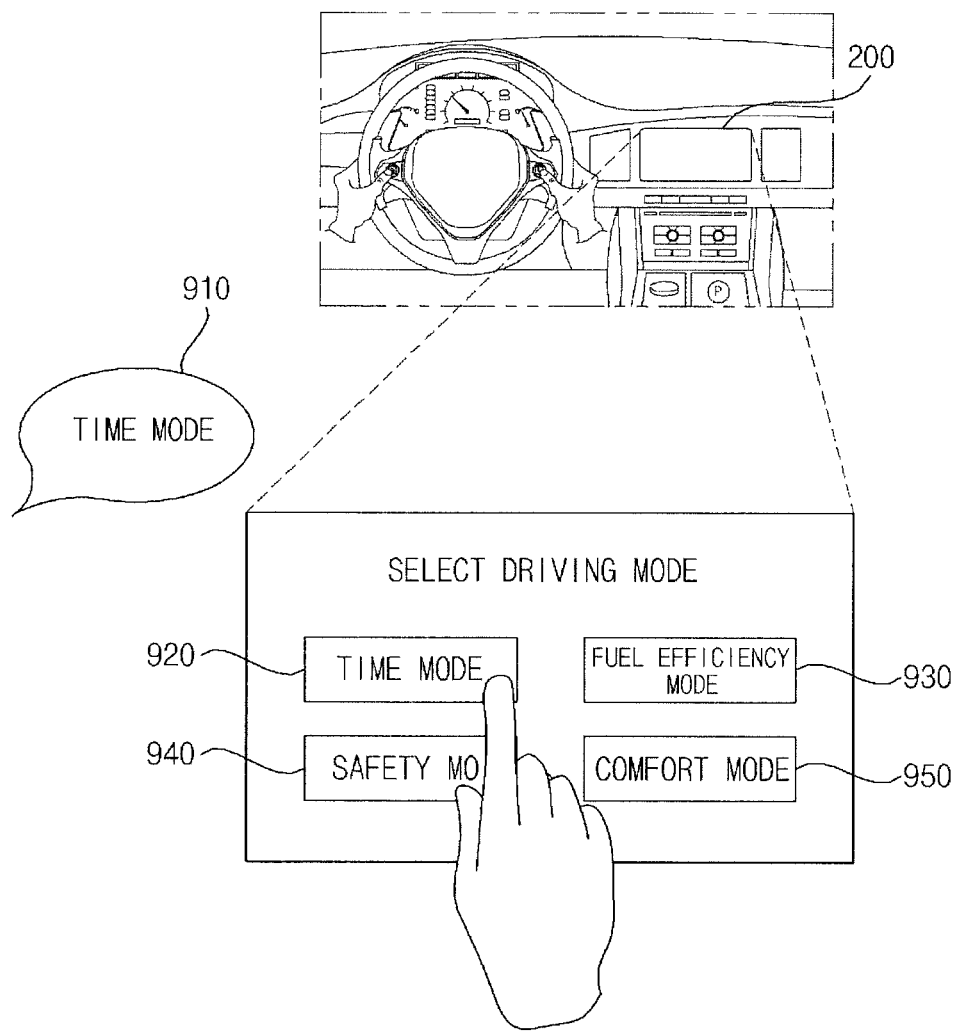

As illustrated in FIG. 9, the controller 170 may receive driving mode selection mode. The controller 170 may receive the driving mode selection mode through the user input unit 124.

When the user input unit 124 and the display device 200 are integrated with each other, the controller 170 may receive the driving mode selection input through the display device 200.

The driving mode may be any one of a time mode, a fuel efficiency mode, a safety mode, and a comfort mode. In this case, the controller 170 may select a time mode 920, a fuel efficiency mode 930, a safety mode 940, or a comfort mode 950 via touch input while a selection input image is displayed.

FIGS. 10A to 10D illustrate an example operation in the case of selection of a time mode according to one implementation.

Figure 10A:
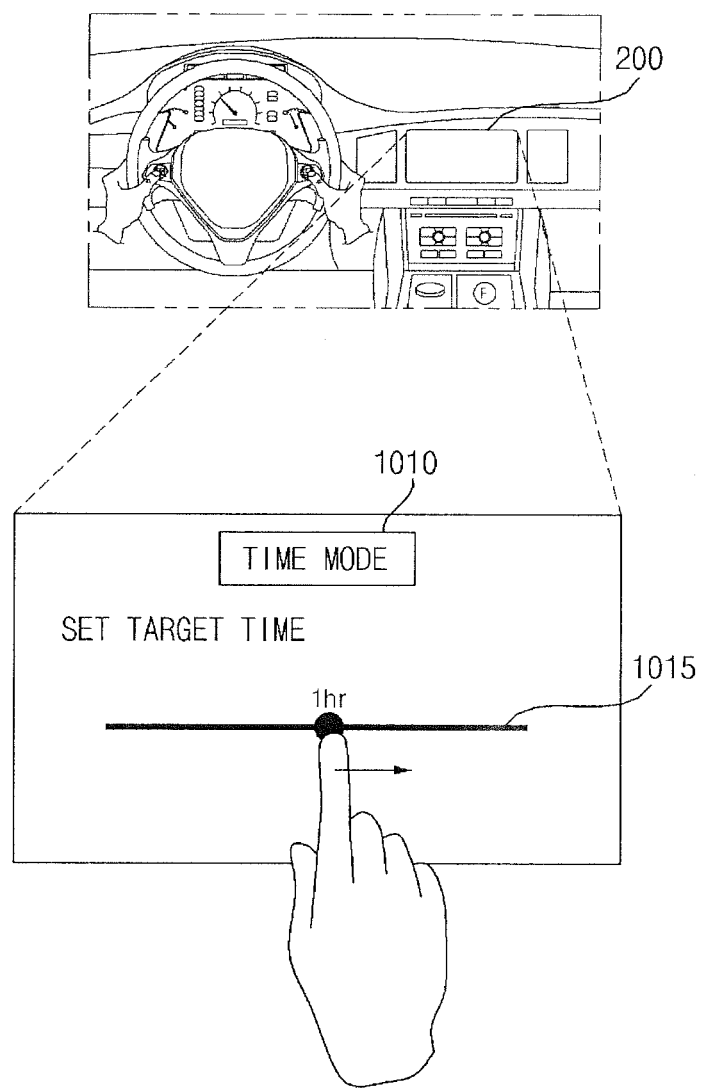

As illustrated in FIG. 10A, when a time mode 1010 is selected, the controller 170 may control the display device 200 to display a target time setting image.

The target time setting image may include a scroll bar 1015. The controller 170 may receive touch and drag input through the scroll bar 1015. In this case, the controller 170 may set time corresponding to a completion time point of drag input as target time.

The controller 170 may control the display device 200 to display distance information to a destination on an image displayed on the display device 200.

Figure 10B:
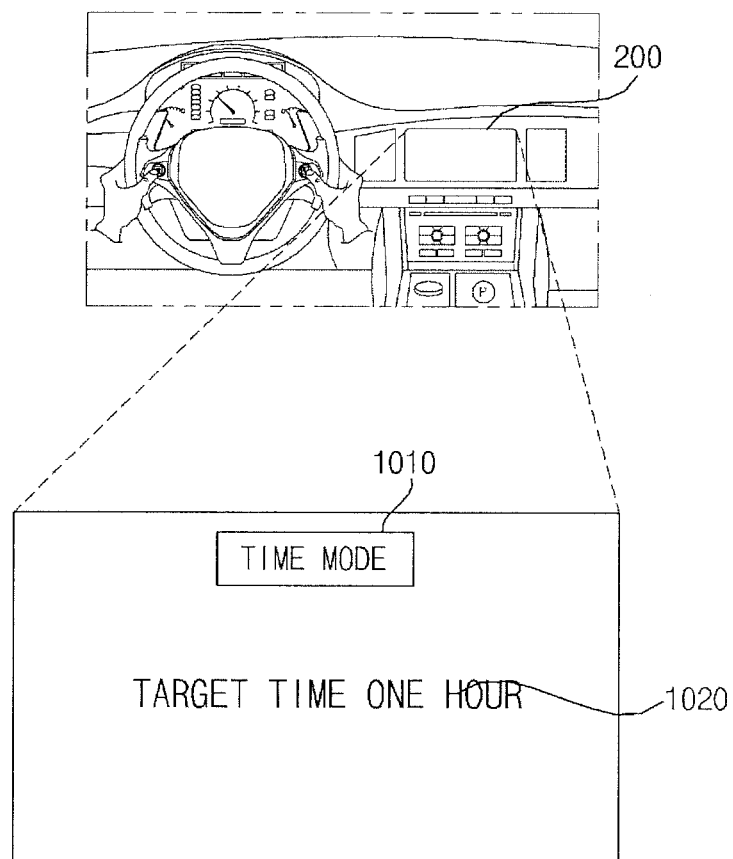

As illustrated in FIG. 10B, when the target time is set, the controller 170 may control the display device 200 to display the set target time 1020.

Figure 10C:
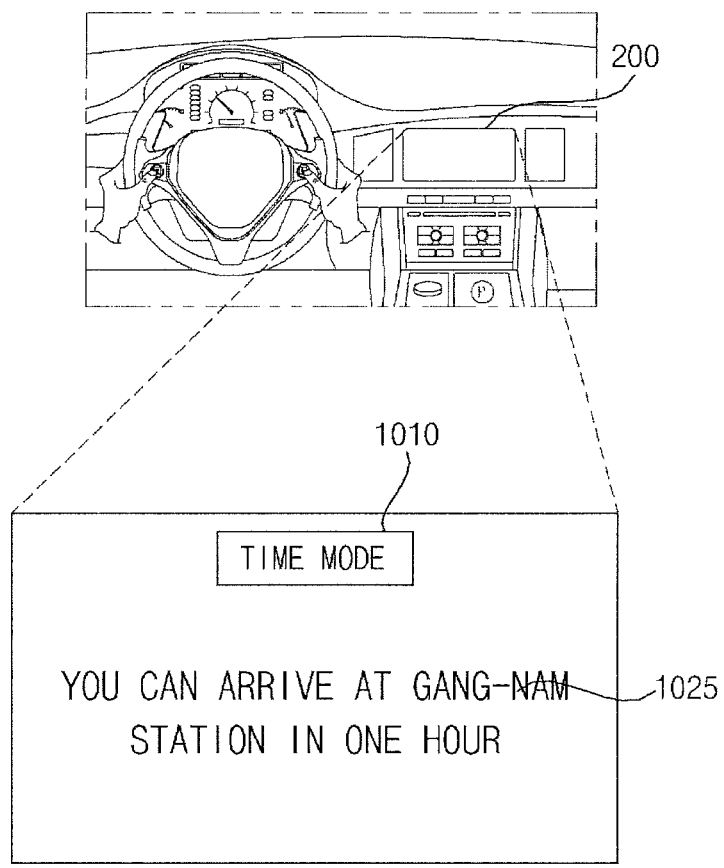

As illustrated in FIG. 10C, when target time is set, the controller 170 may display whether the vehicle arrives at the destination within the set target time (1025). In this case, the controller 170 may receive traffic situation information (e.g., TPEG) of a road from external devices 310, 320, and 330 through the communication unit 110. The controller 170 may determine whether the vehicle arrives at the destination within the target time in consideration of the received traffic situation information of a road.

Figure 10D:
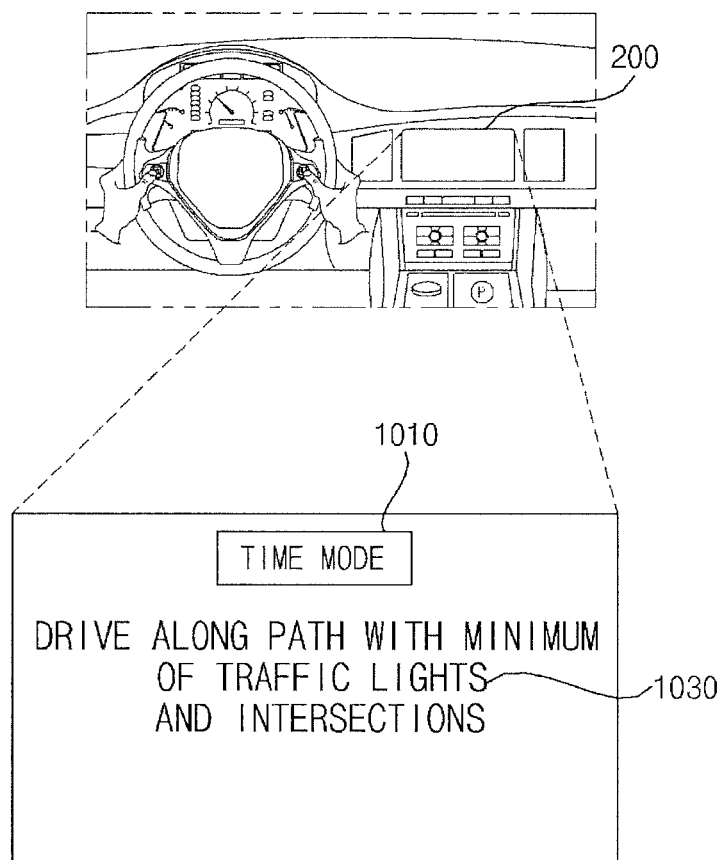

As illustrated in FIG. 10D, when the time mode 1010 is selected, the controller 170 may control the vehicle to select a path with a minimum of traffic signal lights and intersections among a plurality of paths and to drive the vehicle along the path among a plurality of paths. In this case, the controller 170 may control the display device 200 to display information 1030 indicating that the vehicle drives along a path with a minimum of traffic signal lights and intersections.

FIGS. 11A to 11D are diagrams illustrating an example operation in the case of selection of a fuel efficiency mode according to one implementation.

Figure 11A:
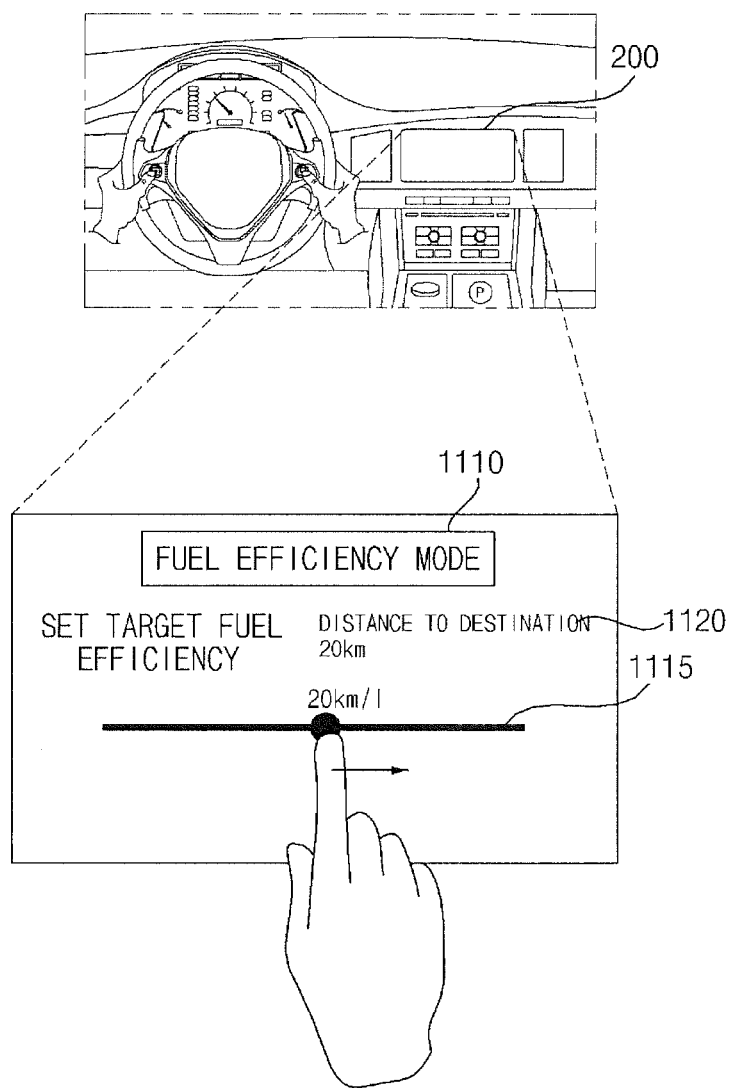

As illustrated in FIG. 11A, when a fuel efficiency mode 1110 is selected, the controller 170 may control the display device 200 to display target fuel efficiency setting image.

The target fuel efficiency setting image may include a scroll bar 1115. The controller 170 may receive touch and drag input through the scroll bar 1115. In this case, the controller 170 may set fuel efficiency corresponding to completion time of drag input as target fuel efficiency.

The controller 170 may control the display device 200 to display distance information 1120 to a destination on a displayed image.

Figure 11B:
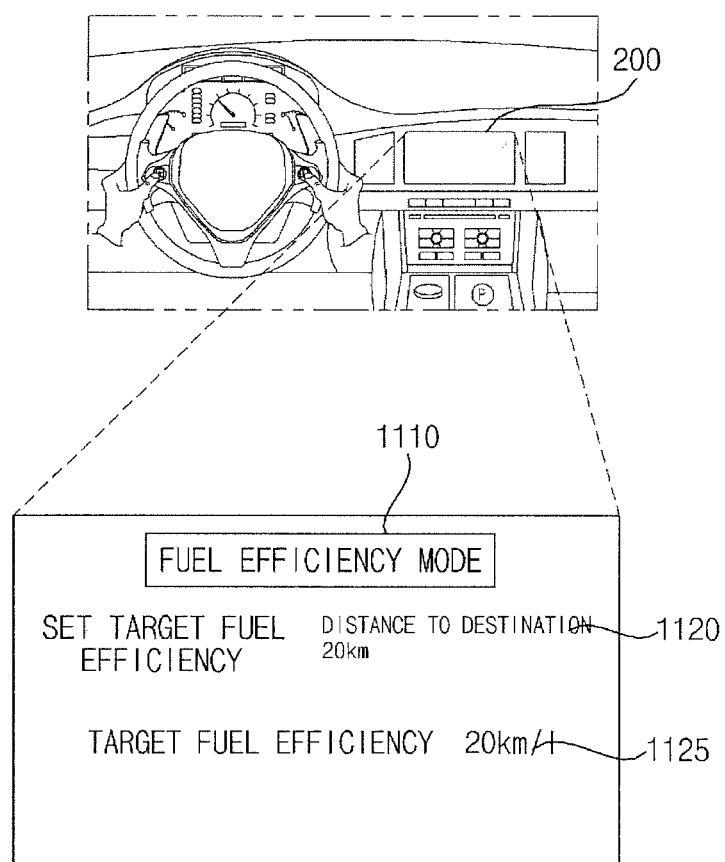

As illustrated in FIG. 11B, when the target fuel efficiency is set, the controller 170 may control the display device 200 to display set target fuel efficiency 1125.

Figure 11C:
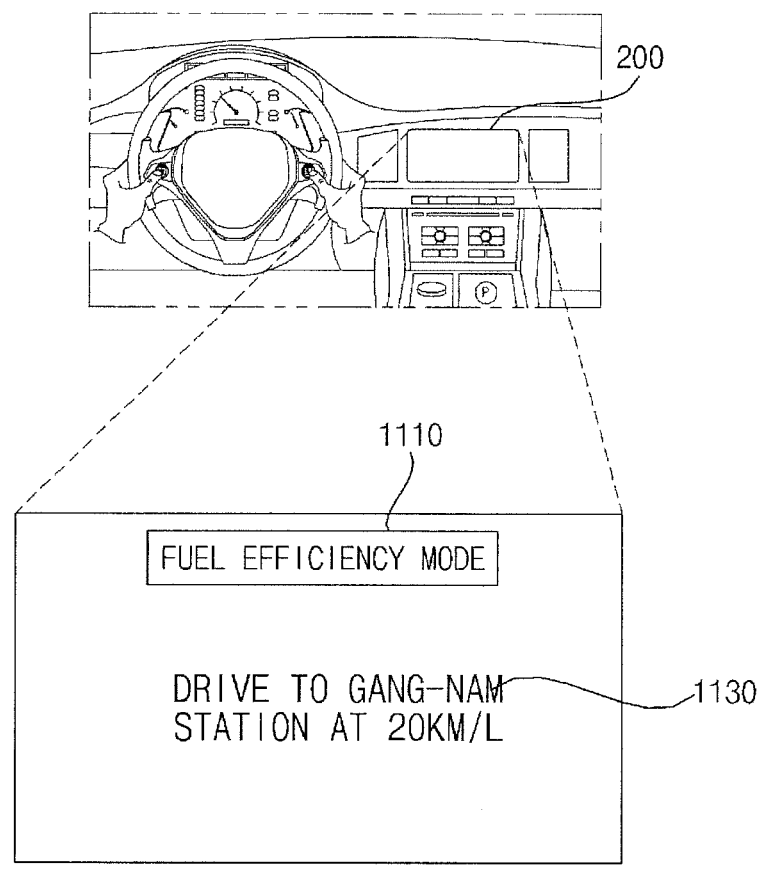

As illustrated in FIG. 11C, when the target fuel efficiency is set, the controller 170 may display whether the vehicle drives with the set target fuel efficiency and arrives at a destination (1130). In this case, the controller 170 may receive the traffic situation information (e.g., TPEG) of a road from the external devices 270, 280, and 290 through the communication unit 110. The controller 170 may determine whether the vehicle drives with the target set fuel efficiency and arrives at the destination in consideration of the traffic situation information of the road.

Figure 11D:
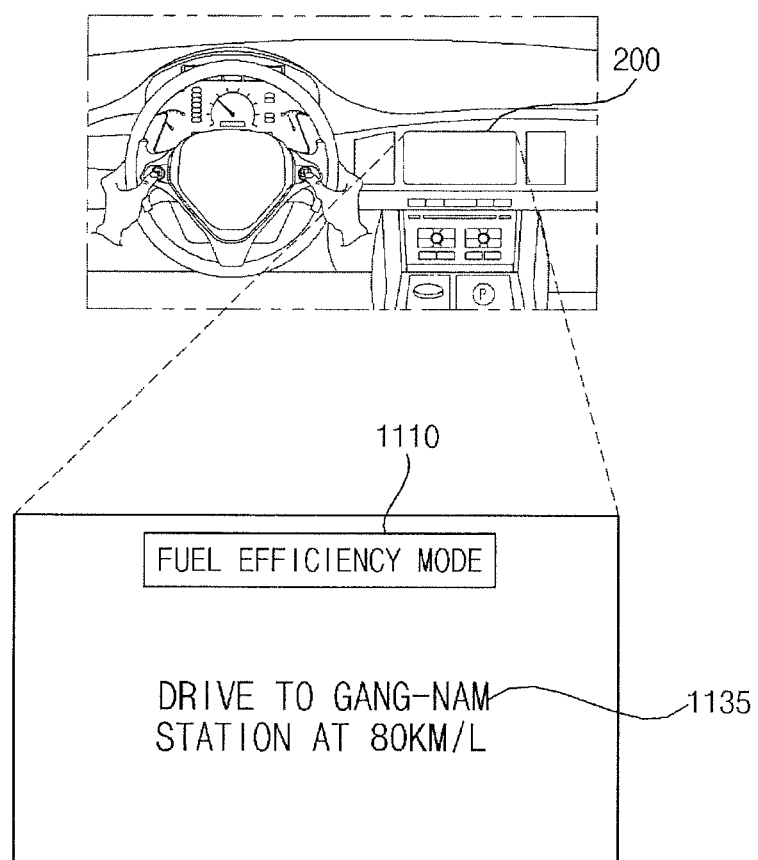

As illustrated in FIG. 11D, the controller 170 may display information 1135 indicating that the vehicle drives to the destination with the set target fuel efficiency on the display device 200.

FIGS. 12A to 12E illustrate example operations in the case of selection of a safety mode according to one implementation.

Figure 12A:
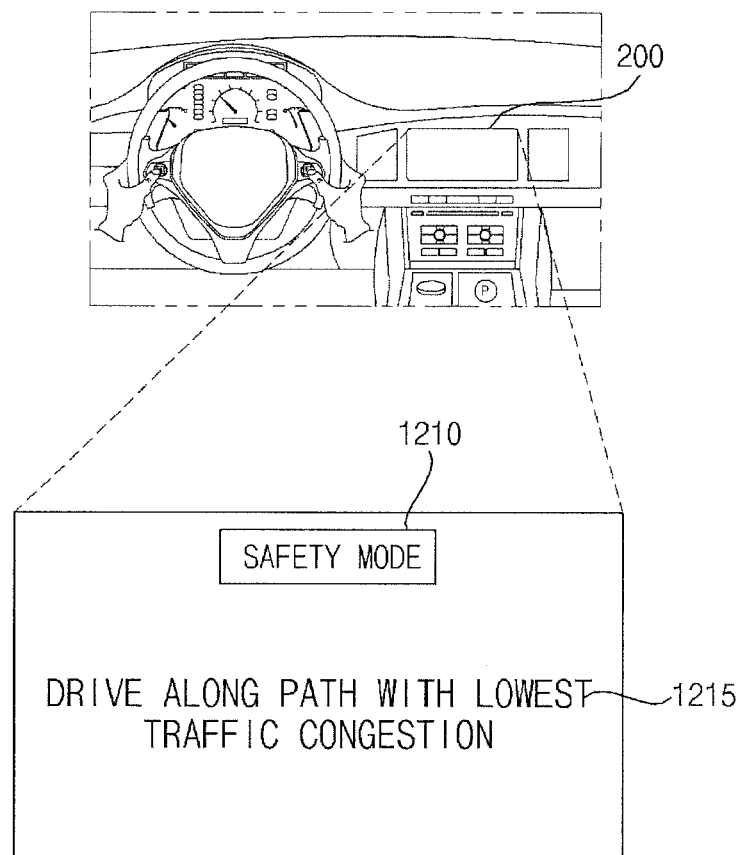

As illustrated in FIG. 12A, when a safety mode 1210 is selected, the controller 170 may select a path with lowest traffic congestion and control the vehicle to be driven along the path among a plurality of paths. In this case, the controller 170 may control the display device 200 to display information 1215 indicating the vehicle drives along the path with the lowest traffic congestion.

In this case, the controller 170 may receive traffic situation information (e.g., TPEG) of a road from external devices 270, 280, and 290 through the communication unit 110. The controller 170 may select a path with the lowest traffic congestion among a plurality of paths in consideration of the received traffic situation information of the road.

Figure 12B:
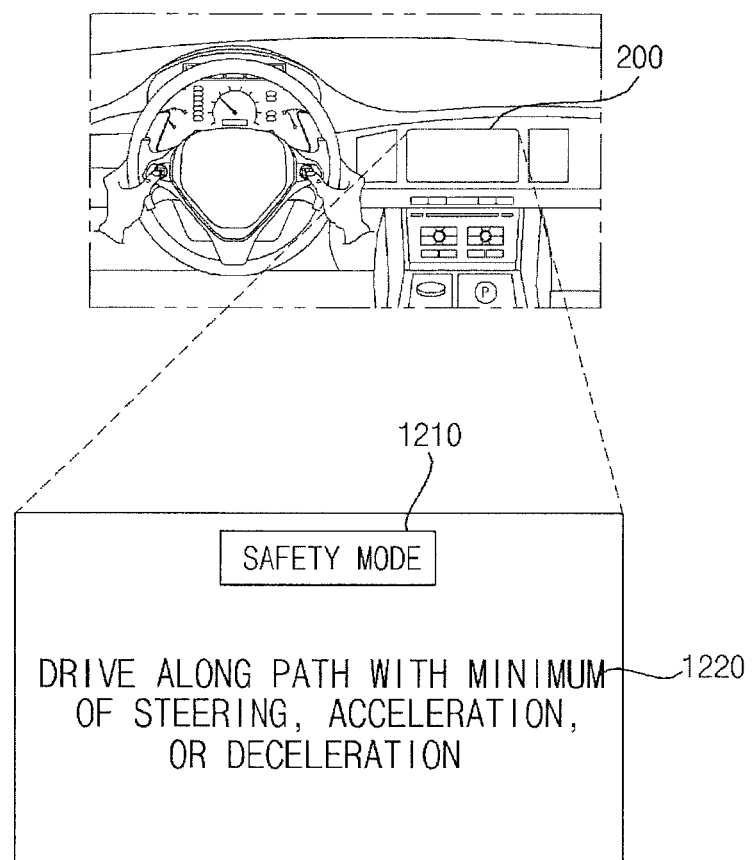

As illustrated in FIG. 12B, when the safety mode 1210 is selected, the controller 170 may select a path with a minimum of steering, acceleration, or deceleration among a plurality of paths and control the vehicle to be driven along the path. In this case, the controller 170 may control the display device 200 to display information 1220 indicating that the vehicle drives along the path with a minimum of steering, acceleration, or deceleration.

In this case, the controller 170 may select the path with a minimum of steering, acceleration, or deceleration among a plurality of paths based on navigation information received from the display device 200 for providing a navigation function.

Figure 12C:
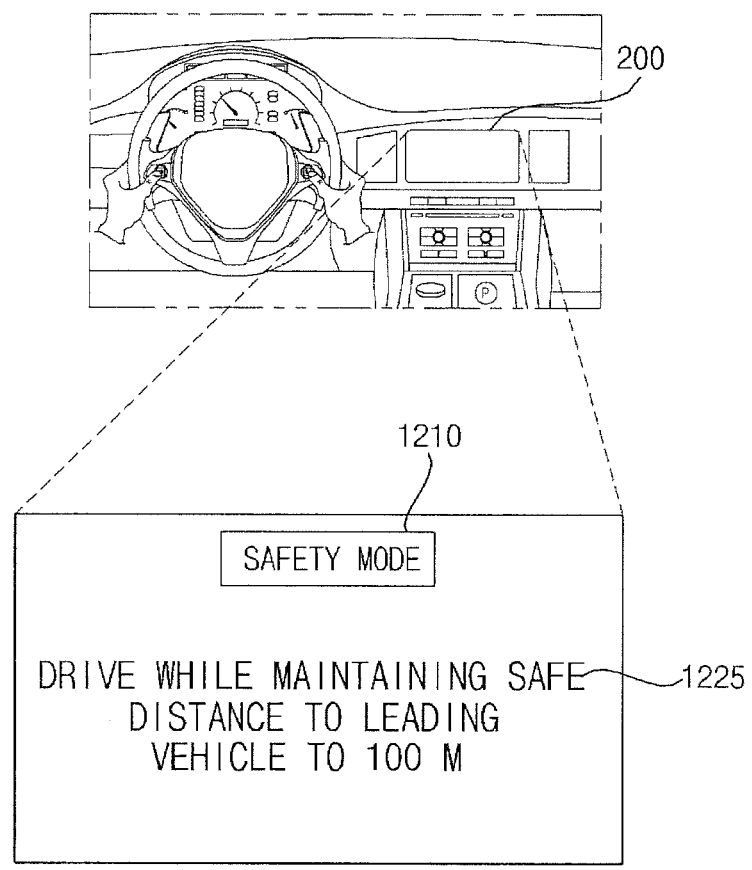

As illustrated in FIG. 12C, when the safety mode 1210 is selected, the controller 170 may perform control to maintain a safe distance from a leading vehicle as a preset distance. In this case, the controller 170 may control the display device 200 to display safe distance information 1225 from the leading vehicle.

The safe distance information from the leading vehicle may be changed in proportion to driving speed.

Figure 12D:
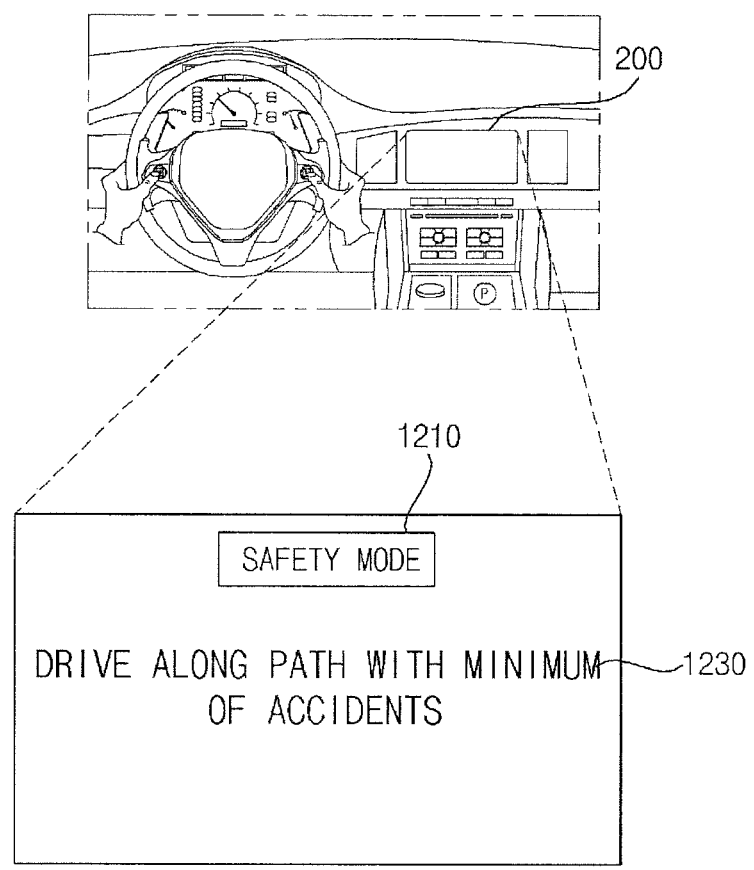

As illustrated in FIG. 12D, when the safety mode 1210 is selected, the controller 170 may select a path with lowest accident history and control the vehicle to be driven along the path. In this case, the controller 170 may control the display device 200 to display information 1230 indicating that the vehicle drives along the path with lowest accident history.

In this case, the controller 170 may receive information about traffic accident history for each path or each section from the external devices 270, 280, and 290 through the communication unit 110. The controller 170 may select a path with lowest accident history among a plurality of paths, based on the received information.

Figure 12E:
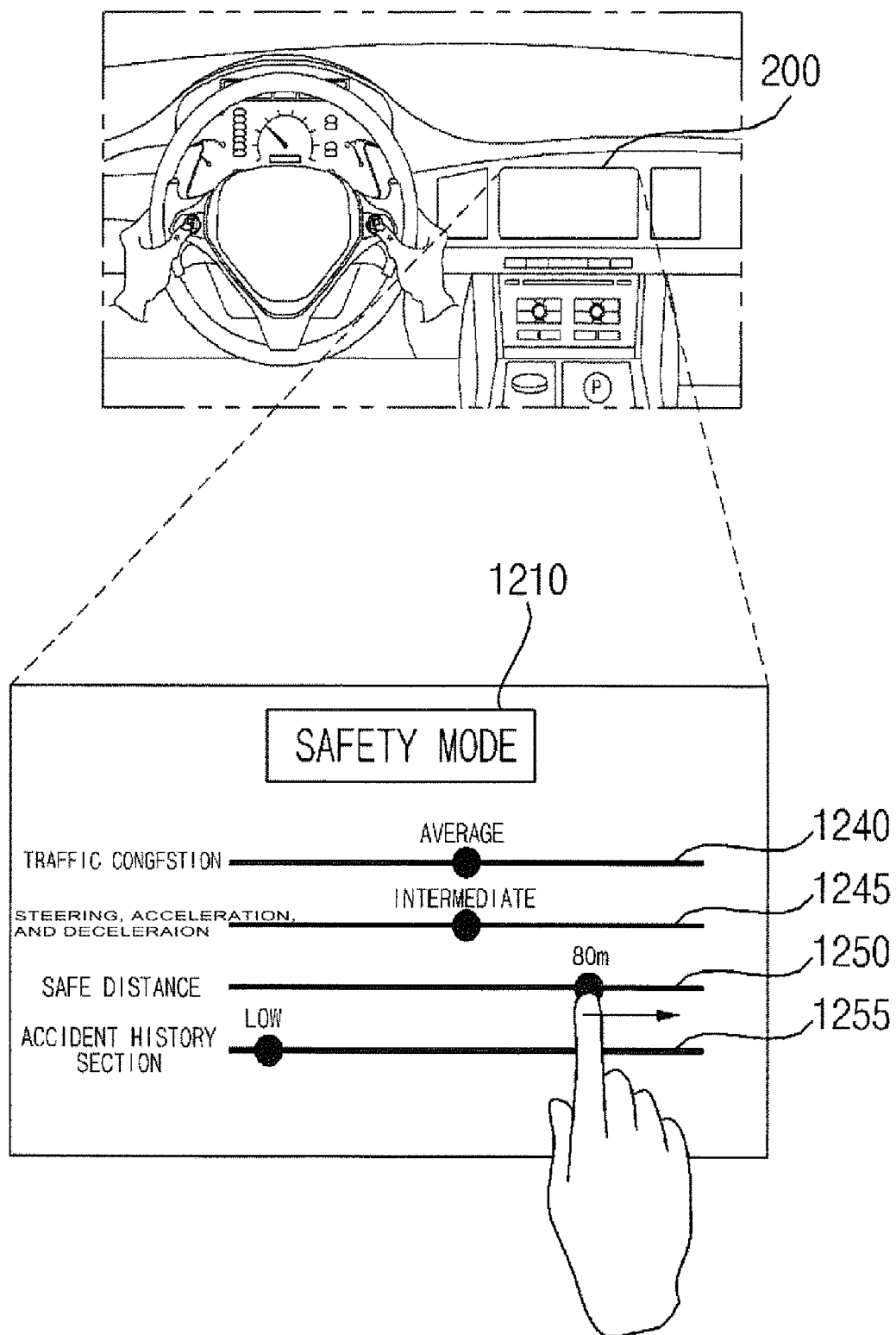

As illustrated in FIG. 12E, when the safety mode 1210 is selected, the controller 170 may control the vehicle to be driven based on at least one of information items containing traffic congestion, steering, acceleration or deceleration, a safe distance, or an accident history section. In addition, the controller 170 may control the vehicle to be driven based on a combination of traffic congestion, steering, acceleration or deceleration, a safe distance, or an accident history section.

The controller 170 may control the display device 200 to display an image for traffic congestion, steering, acceleration or deceleration, a safe distance, or an accident history section.

The controller 170 may receive input for setting traffic congestion, steering, acceleration or deceleration, a safe distance, or an accident history section through the image.

In this case, when any one of traffic congestion, steering, acceleration or deceleration, a safe distance, or an accident history section is set, other elements may be organically set to correspond to the set element.

For example, when traffic congestion is set to average, a number of times of steering, acceleration, and deceleration may be correspondingly set, a safe distance may be set to 80 m, and the accident history may be set to low.

In some implementations, the controller 170 may receive setting input for each of traffic congestion, steering, acceleration or deceleration, a safe distance, and an accident history section.

Figure 13:
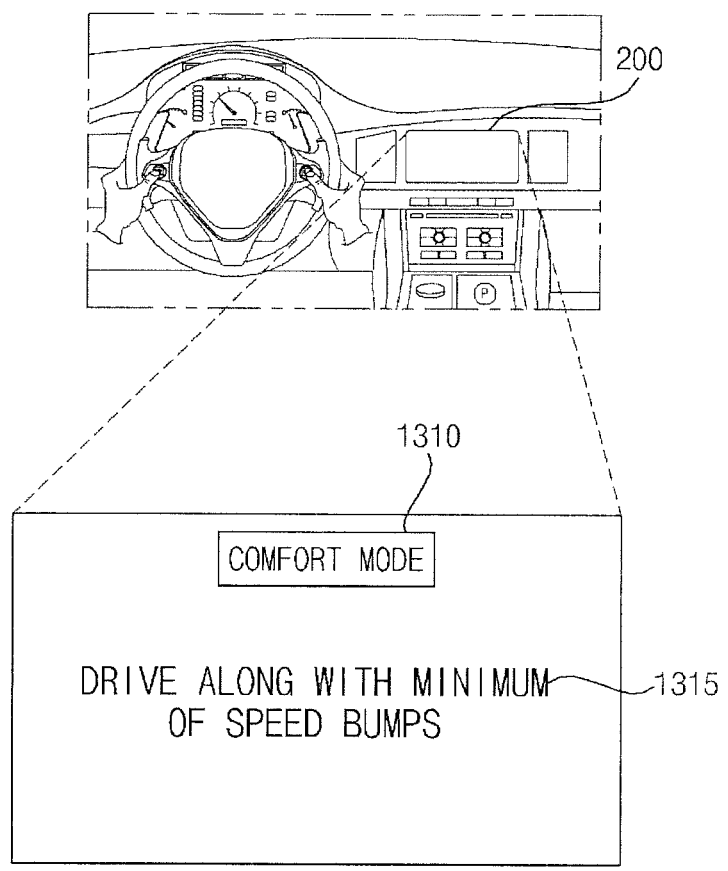

FIG. 13 illustrates an example operation in the case of selection of a comfort mode according to one implementation.

As illustrated in FIG. 13, when a comfort mode 1310 is selected, the controller 170 may control the vehicle to be driven along a path with a minimum of speed bumps, curves, uphill slopes, and downhill slopes among a plurality of paths. Alternatively, the controller 170 may control the vehicle to be driven along a path with a lowest combination of a number of speed bumps, curves, uphill slopes, and downhill slopes among a plurality of paths.

In this case, the controller 170 may control the display device 200 to display information 1315 indicating that the vehicle drives along a path with a minimum of speed bumps, curves, uphill slopes, and downhill slopes.

The above disclosure may be embodied as computer readable codes on a computer readable recording medium. The computer readable recording medium is any data storage device that can store data which can be thereafter read by a computer system. Examples of the computer readable recording medium include a hard disk drive (HDD), a solid state disk (SSD), a silicon disk drive (SDD), a read-only memory (ROM), a random-access memory (RAM), CD-ROMs, magnetic tapes, floppy disks, optical data storage devices, etc. and may be embodied in the form of carrier wave (e.g., transmission via the Internet). In addition, the computer may include the controller 170.

The various examples of the present disclosure may have one or more of the following advantages.

First, a driving mode may be selected according to user selection so as to provide a function of an autonomous driving function according to a user.

Second, a supercharger function, a turbocharger function, a throttle valve, tier pneumatic, lift, and so on may be controlled so as to control driving output and braking of the autonomous vehicle.

Third, when a time mode is selected, target driving time may be set and a vehicle arrives at a destination within the target driving time, thereby providing user convenience.

Fourth, when a fuel efficiency mode is selected, the vehicle may be driven according to target fuel efficiency, thereby reducing energy consumption.

Fifth, when a safety mode is selected, the vehicle may be driven according to various road situations, thereby improving safer driving conditions to a user.

Sixth, when a comfort mode is selected, comfortable rest may be provided to a user during driving.

Although the preferred implementations of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An autonomous vehicle comprising:
an input unit configured to receive selection input of at least one of a plurality of modes;
a suspension apparatus configured to change a height of the vehicle;
a suspension driver configured to perform electronic control of the suspension apparatus of the vehicle;
a power source driver configured to control an engine comprising a supercharger and a turbocharger; and
a controller that is configured to control the power source driver to turn the supercharger or the turbocharger on or off according to a selected mode among the plurality of modes and that is configured to control the suspension driver according to the selected mode,
wherein the plurality of modes include at least one of a time mode, a fuel efficiency mode, a safety mode, or a comfort mode,
wherein the controller is further configured to:
based on the fuel efficiency mode being selected, control the suspension driver to lower the height of the vehicle during driving the vehicle to a destination, and
based on the safety mode or the comfort mode being selected, control the suspension driver to change at least one of a left side height or a right side height of the vehicle during driving the vehicle along a curved route or at a turn.

2. The autonomous vehicle according to claim 1, further comprising a display device configured to display navigation information,
wherein the controller is configured to control the power source driver based further on path information to the set destination, provided from the navigation information.

3. The autonomous vehicle according to claim 1, further comprising a camera module configured to acquire a vehicle front image, a vehicle rear image, or a vehicle surroundings image to thereby detect an object,
wherein the controller is configured to control the power source driver based further on information of the detected object, provided from the camera module.

4. The autonomous vehicle according to claim 3, wherein:
the camera module is configured to detect an uphill slope, a downhill slope, or a curve in the road; and
the controller is configured to control the power source driver based on whether the uphill slope, the downhill slope, or the curve is detected.

5. The autonomous vehicle according to claim 1, further comprising:
a pneumatic management unit configured to manage pneumatic condition of a tire; and
a lift management unit configured to manage lift,
wherein the controller is further configured to control the pneumatic management unit or the lift management unit according to the selected mode.

6. The autonomous vehicle according to claim 5, wherein the controller is configured to control the pneumatic management unit to lower or raise a pneumatic pressure of the tire according to the selected mode, and wherein the controller is configured to control the lift management unit to adjust a spoiler according to the selected mode.

7. The autonomous vehicle according to claim 1, further comprising a throttle valve configured to control an amount of fuel introduced into the engine,
wherein the controller is configured to control the throttle valve according to the selected mode.

8. The autonomous vehicle according to claim 1,
wherein the controller is further configured to:
based on the time mode being selected, control the power source driver such that the autonomous vehicle arrives at the destination within a minimum time or a target arrival time,
based on the fuel efficiency mode being selected, control the power source driver such that the autonomous vehicle arrives at the destination with a target fuel efficiency,
based on the safety mode being selected, control the power source driver such that the autonomous vehicle drives to the destination according to a predetermined safe driving condition, and
based on the comfort mode being selected, control the power source driver such that the autonomous vehicle drives to the destination according to a predetermined comfort driving condition.

9. The autonomous vehicle according to claim 8, wherein the controller is configured to, based on the time mode being selected, receive target arrival time or target driving time input up to the set destination and control the vehicle to be driven according to the target arrival time or the target driving time.

10. The autonomous vehicle according to claim 9, further comprising a display device configured to display an image for inputting the target arrival time or the target driving time,
wherein the display device is configured to, based on the target arrival time or the target driving time being input, display whether the vehicle will arrive at the destination within the target arrival time or the target driving time.

11. The autonomous vehicle according to claim 9, wherein the controller is configured to, based on the time mode being selected, control the vehicle to be driven along a path with a minimum of traffic signal lights or intersections among a plurality of paths to the destination.

12. The autonomous vehicle according to claim 8, wherein the controller is configured to, based on the fuel efficiency mode being selected, receive target fuel efficiency input for driving to the destination and control the vehicle according to the target fuel efficiency.

13. The autonomous vehicle according to claim 12, further comprising a display device configured to display an image comprising a scroll bar for inputting the target fuel efficiency,
wherein the controller is configured to control the vehicle according to input through the scroll bar.

14. The autonomous vehicle according to claim 12, wherein the controller is configured to, based on the fuel efficiency mode being selected, control the vehicle to be driven while maintaining preset speed.

15. The autonomous vehicle according to claim 8, wherein the controller is configured to, based on the safety mode being selected, control the vehicle based on at least one of section information including traffic congestion, steering, acceleration or deceleration, a safe distance, or accident history.

16. The autonomous vehicle according to claim 15, wherein the controller is configured to, based on the safety mode being selected, control the vehicle to be driven along a path with lowest traffic congestion among a plurality of paths to the destination.

17. The autonomous vehicle according to claim 15, wherein the controller is configured to, based on the safety mode being selected, control the vehicle to be driven along a path with a minimum of steering, acceleration, or deceleration among a plurality of paths to the destination.

18. The autonomous vehicle according to claim 15, wherein the controller is configured to control the vehicle to be driven while maintaining a preset distance or more from a leading vehicle.

19. The autonomous vehicle according to claim 15, wherein the controller is configured to control the vehicle to be driven along a path with lowest accident history among a plurality of paths to the destination.

20. The autonomous vehicle according to claim 15, wherein the controller is configured to receive setting input corresponding to section information including traffic congestion, steering, acceleration or deceleration, a distance, and accident history through the input unit and control the vehicle to be driven according to the setting input.

21. The autonomous vehicle according to claim 8, wherein the controller is configured to, based on the comfort mode being selected, control the vehicle to be driven along a path with a minimum of speed bumps, curves, uphill slopes, and downhill slopes among a plurality of paths to a destination.

* * * * *